United States Patent [19]

Miyasaka

[11] Patent Number: 6,005,689
[45] Date of Patent: Dec. 21, 1999

[54] IMAGE PROCESSING SYSTEM

[75] Inventor: Tetsuo Miyasaka, Kanagawa-ken, Japan

[73] Assignee: Olympus Optical Co., Ltd., Tokyo, Japan

[21] Appl. No.: 08/786,172

[22] Filed: Jan. 21, 1997

[30] Foreign Application Priority Data

Jan. 22, 1996 [JP] Japan ................................. 8-008374

[51] Int. Cl.$^6$ .............................. H04N 1/46; H04N 3/14
[52] U.S. Cl. ...................... 358/513; 358/513; 358/515; 358/514; 358/512; 348/274; 348/275
[58] Field of Search .................................. 348/274, 275, 348/280, 324; 358/512–515, 494, 498

[56] References Cited

U.S. PATENT DOCUMENTS

| 4,743,963 | 5/1988 | Abuyama ................................. 358/451 |
| 5,481,401 | 1/1996 | Kita et al. ................................. 359/353 |
| 5,784,180 | 7/1998 | Sakai et al. ................................. 358/515 |

FOREIGN PATENT DOCUMENTS 51-83674   7/1992   Japan .

*Primary Examiner*—Edward L. Coles
*Assistant Examiner*—Twyler Lamb
*Attorney, Agent, or Firm*—Kenyon & Kenyon

[57] ABSTRACT

An image input and output system for scanning an image of a color original and processing data of the scanned image has a color line sensor for picking up the image of the original. The system also includes a memory for sequentially storing three types of data respectively representing the three primary colors and which are outputted from the color line sensor, in the order in which the data are outputted. An output control circuit calculates an address to read out the data stored in the memory such that a series of three data respectively representing the three primary colors and composing a first pixel partially overlaps with a series of three data respectively representing the three primary colors and composing a second pixel next to the first pixel, and for reading out, from the memory in accordance with the calculated address, a series of three data respectively representing the three primary colors to produce image data of the three primary colors for one pixel. The image input and output system can set an arbitrary pixel ratio and is free from image deterioration.

20 Claims, 20 Drawing Sheets

IMAGE PROCESSING SYSTEM

BACKGROUND OF THE INVENTION

1. Field of the Invention

The present invention relates to an image processing system having a function of inputting an image by using a line sensor having linearly arranged sensors, and more particularly to an image input apparatus (so-called scanner) for scanning an original color image carried on a paper, a film or the like.

2. Description of the Related Art

A line scanner with a line sensor for scanning an image has been known. For example, Japanese Laid-Open Patent Application Publication No. Hei 5-183674 discloses an image input and output apparatus for storing image data in a memory, and outputting the image data to an external apparatus via a small computer system interface (SCSI) or a general purpose interface bus (GPIB). In this conventional art, the memory serves as a frame memory for storing the data of one image when the image data required by the external apparatus are less than the image data stored in the memory. Further, the memory functions as a buffer memory for storing a part of data of one image when the image data required by the external apparatus are more than the image data stored in the memory. Generally, the larger or the more highly resolved an output image is, the more the data for the output image are. When the output image is highly resolved, all pixels of the input image are stored in the memory. On the other hand, when the outputted image is low resolved, part of the input pixels are extracted and stored in the memory.

FIG. 12 illustrates a conventional method of outputting data to an output apparatus. A memory 201 sequentially stores digital data corresponding to the three primary colors, i.e., red (R), green (G) and blue (B), from the line sensor in the order of $R_1, G_1, B_1, R_2, G_2, B_2, R_3, G_3, B_3, \ldots$ When the digital data are outputted to an output apparatus 202, a set of color data having the same subscript are outputted as the data for one pixel. That is, whenever the color data for one pixel have been outputted from the memory 201, the address pointed by an address pointer is increased by three to output the corresponding data.

In the conventional art described above, when the number of pixels of the external apparatus or the output apparatus (e.g., a display or a printer) is different from that of the image input apparatus, part of the image data are extracted and then stored in a memory in the output apparatus 202 or the like. The extraction is implemented as described below. Suppose $\alpha$ (a natural number) represents the number of pixels of the output apparatus, and $\beta$ (a natural number) represents the number of pixels of the input apparatus. The ratio $\alpha/\beta$ is called the pixel ratio. Suppose N' (a natural number) is the serial number of a pixel to be extracted from the memory. Then N' can be calculated by the equation $N'=[N \times (\beta/\alpha); N=1, \ldots, \beta]$, which is an operation to obtain the largest natural number less than the value calculated by $N \times (\beta/\alpha)$. For example, when the pixel ratio is 6/10, the serial numbers of the pixels to be extracted are calculated by putting $N=1, \ldots, 10$, $\alpha=6$ and $\beta=10$ into the equation $[N \times (\beta/\alpha)]$. Therefore, by the calculation, a series of pixels Nos. 1, 3, 5, 6, 8 and 10 is obtained. However, when such an extraction is implemented, adjacent pixels may be extracted (e.g., 5 and 6 in the above series). That is, there may exist at least one uneven interval in the series except when the pixel ratio is defined by $1/\gamma$ ($\gamma$ is a natural number).

When there is an uneven interval in the series, for example, an inclined line in an image is displayed as a discrete line so that the quality of the image is deteriorated. Therefore, in the conventional art, the pixel ratio can be set only to $1/\gamma$ to prevent the deterioration of the image quality. Alternatively, after an image is acquired, the image is corrected by implementing a predetermined interpolating operation between adjacent pixels.

However, when the pixel ratio is limited, the number of the extracted pixels may be too small or too large for the output apparatus. Further, in order to correct the image, an image correction circuit or an image processing software program is required so that the cost of the image processing system will be increased or image processing time will become long.

SUMMARY OF THE INVENTION

A primary object of the present invention is to provide a low-priced image processing system including an image input apparatus, in which an arbitrary pixel ratio can be set and no deterioration of image quality will occur.

In one aspect of the present invention, an image processing system comprises a color line sensor for decomposing a pixel of an original image into three light components respectively representing the three primary colors, and for converting the light components to analog signals. The color line sensor has a number of pixels. The image processing system of the present invention further includes an analog-to-digital converting means for converting the analog signals to digital data. This digital data is stored in a storage means for storing the digital data. An input control means controls the color line sensor and the analog-to-digital converter to store the digital data in the storage means in the order in which the digital data are read out from the color line sensor, and an output control means for reads out the digital data from the storage medium repeatedly in part such that a new pixel is formed by a part of the digital data of a first pixel and a part of the digital data of a second pixel adjacent to the first pixel. This reading operation is repeated to produce digital data corresponding to a number of pixels that is greater than the number of pixels of the color line sensor.

In another aspect of the present invention, an image processing system for processing data outputted from an image input apparatus having a color line sensor for picking up an image of an original comprises storage means for sequentially storing three types of data respectively representing the three primary colors and outputted from the image input apparatus, in the order in which the data are outputted. calculating means calculates an address to read out the data stored in the storage means such that a series of three data respectively representing the three primary colors and composing a first pixel partially overlaps with a series of three data respectively representing the three primary colors and composing a second pixel next to the first pixel. and producing means reads out from the storage means, in accordance with the address calculated by the calculating means, a series of three data respectively representing the three primary colors to produce image data of the three primary colors for one pixel.

In still another aspect of the present invention, the present invention relates to an image processing method for decomposing by a color line sensor a pixel of an original image into three light components respectively representing the three primary colors. In this method converting the light components are converted to image signals. In order to accomplish these functions, the method according to the present invention and digital image data is produced from the image signals comprises the steps of: sequentially converting to digital data the image signals outputted from the color line sensor; sequentially storing the digital data in a storage device at corresponding addresses in the order in which the digital data are converted; reading out the digital data from the storage device repeatedly in part by designating the addresses such that a new pixel is formed by a part of the digital data of a first pixel and a part of the digital data of a second pixel adjacent to the first pixel; and repeating this reading operation to produce digital data corresponding to a number of pixels that is greater than the number of pixels of the color line sensor.

In a further aspect of the present invention, an image processing system for processing data outputted from an image input apparatus having a color line sensor for picking up an image of an original comprises a storage device for sequentially storing three data respectively representing the three primary colors and outputted from the image input apparatus, in the order in which the data are outputted. A controller calculates an address to read out the data stored in the storage device such that a series of three data respectively representing the three primary colors and composing a first pixel partially overlaps with a series of three data respectively representing the three primary colors and composing a second pixel next to the first pixel. In accordance with the calculated address, a series of three data respectively representing the three primary colors to produce image data of the three primary colors for one pixel.

BRIER DESCRIPTION OF THE DRAWINGS

DETAILED DESCRIPTION OF THE PREFERRED EMBODIMENTS

Before describing details of embodiments of the present invention, a summary of the embodiments will now be described, referring to FIGS. 1a and 1b and FIGS. 2a and 2b.

Figure 1A:
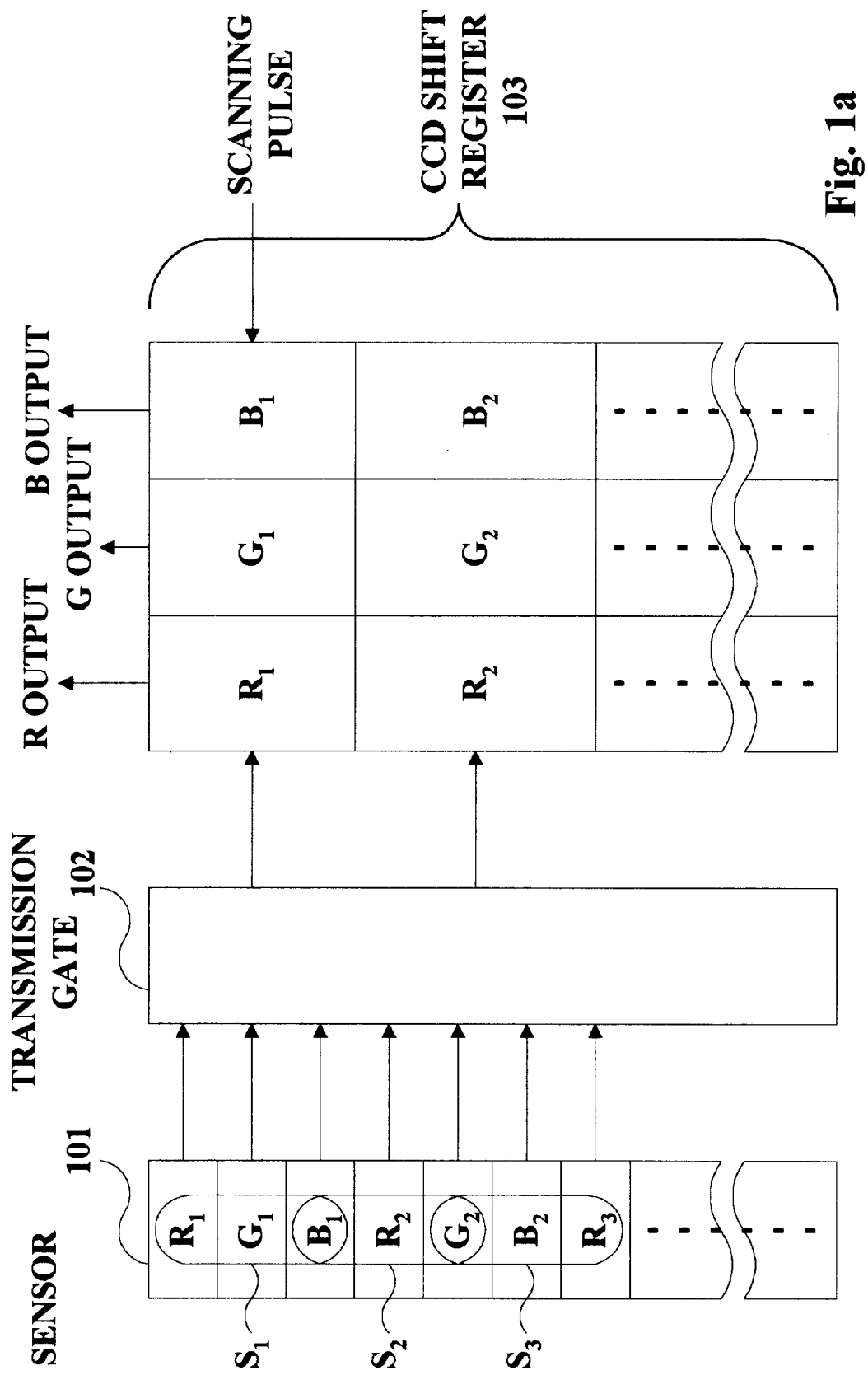
FIG. 1a is a block diagram for schematically explaining the embodiments of the present invention and showing the structure and operation of a charge-coupled device (hereinafter called "CCD") of a one-line type.

FIG. 1a illustrates a line CCD of a one-line type, in which sensing elements for respectively sensing the three primary colors, i.e., red (R), green (G) and blue (B), are sequentially arranged in a line. As is well known, this line sensor 101 is a sensor in which a color filter (not shown) is arranged on each of the linearly arranged sensing elements. The outputs from the respective sensing elements for sensing the three primary colors, R, G and B, are transmitted via a transmission gate 102 to a CCD shift register 103 including a plurality of registers. Therefore, the outputs from the sensing elements $R_1$, $G_1$ and $B_1$ are transmitted to a register in a first row of the CCD shift register 103, and the outputs from the sensing elements $R_2$, $G_2$ and $B_2$ are also transmitted to a register in a second row of the CCD shift register 103.

When a scanning pulse signal is inputted to the CCD shift register 103, the R, G and B data stored in the CCD shift register 103 are shifted and sequentially transmitted to and stored in a memory. The data stored in the memory will be transmitted to an output apparatus.

In the conventional art, a set of the color data having the same subscripts forms one pixel to be outputted. For example, $R_1$, $G_1$, and $B_1$ form the first pixel, and $R_2$, $G_2$, and $B_2$ form the second pixel.

In the present invention, as shown in the drawings, the outputs of three consecutive sensing elements are combined to form one pixel in such a manner that the first pixel ($s_1$) is formed by $R_1$, $G_1$, and $B_1$; the second pixel ($s_2$) is formed by $B_1$, $R_2$, and $G_2$; and the third pixel ($s_3$) is formed by $G_2$, $B_2$ and $R_3$. In general, the (3p-2)-th pixel (i.e., $s_{3p-2}$) is formed by the outputs from the (6p-5)-th, (6p-4)-th, and (6p-3)-th sensing elements, that is, $R_{2p-1}$, $G_{2p-1}$, and $B_{2p-1}$; the (3p-1)-th pixel (i.e., $s_{3p-1}$) is formed by the outputs from the (6p-3)-th, (6p-2)-th, and (6p-1)-th sensing elements, that is, $B_{2p-1}$, $R_{2p}$, and $G_{2p}$; and the (3p)-th pixel (i.e., $s_{3p}$) is formed by the outputs from the (6p-1)-th, (6p)-th, and (6p+1)-th sensing elements, that is, $G_{2p}$, $B_{2p}$, and $R_{2p}$, where p is a natural number. This is called mode 1. In mode 1, the number of pixels can be increased about 1.5 times as much as that of the conventional art.

Although not shown in the drawings, the outputs of the sensing elements may be combined in such a manner that the first pixel ($s_1$) is formed by $R_1$, $G_1$, and $B_1$; the second pixel ($s_2$) is formed by $G_1$, $B_1$, and $R_2$; and the third pixel ($s_3$) is formed by $B_1$, $R_2$ and $G_2$. In general, the (3q-2)-th pixel (i.e., $s_{3-2}$) is formed by the outputs from the (3q-2)-th, (3q−1)-th, and (3q)-th sensing elements, that is, $R_p$, $G_p$, and $B_p$; the (3q−1)-th pixel (i.e., $s_{3q-1}$) is formed by the outputs from (3p−1)-th, (3p)-th, and (3p+1)-th sensing elements, that is, $G_p$, $B_p$, and $R_{p+1}$; and the (3q)-th pixel (i.e., $s_{3q}$) is formed by the outputs from the (3p)-th, (3p+1)-th, and (3p+2)-th sensing elements, that is, $B_n$, $R_{n+1}$, and $G_{n+1}$, where q is a natural number. This is called mode 2. In mode 2, the number of pixels can be increased about 3 times as much as that of the conventional art.

Figure 1B:
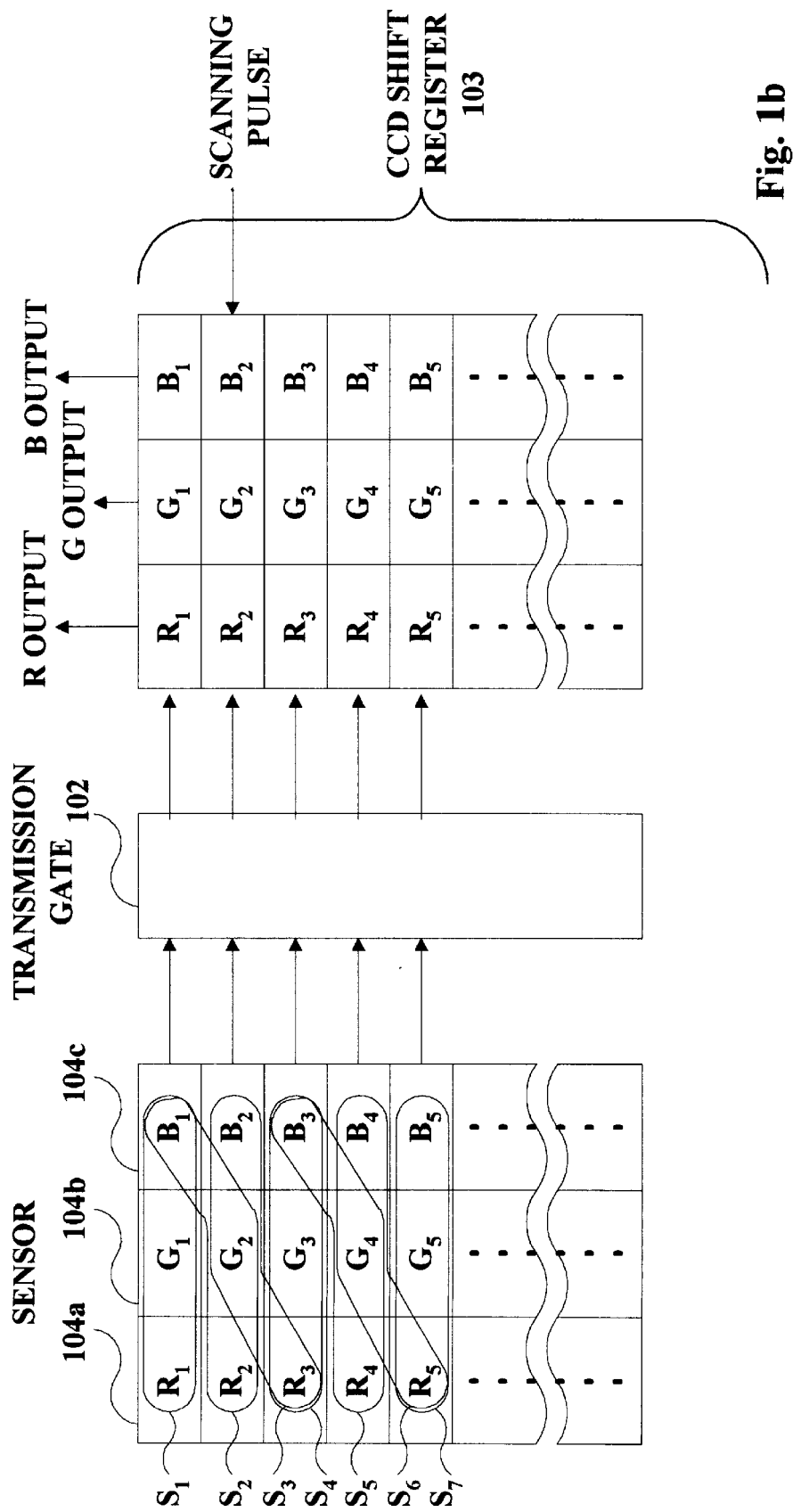
FIG. 1b is a block diagram for schematically explaining embodiments of the present invention and showing the structure and operation of a CCD of a three-line type.

FIG. 1b illustrates a line CCD of a three-line type, in which three sets of sensing elements for sensing the three primary colors, i.e., red (R), green (G) and blue (B), respectively are arranged separately in three lines. Sensor lines 104a, 104b and 104c which comprise a number of sensing elements for R, G and B, are respectively arranged in parallel in a color line sensor 104, and red, green and blue filters are located on the sensor lines 104a, 104b and 104c, respectively. The outputs from the sensor lines 104a, 104b and 104c are transmitted to a CCD shift register 103 via a transmission gate 102, in the same way as in the CCD of a one-line type. For example, as illustrated in FIG. 1b, the outputs from the sensing elements $R_1$ $G_1$ and $B_1$ are transmitted to a register in a first row of the CCD shift register 103, and the outputs from the sensing elements $R_2$, $G_2$ and $B_2$ are transmitted to a register in a second row.

When a scanning pulse signal is inputted to the CCD shift register 103, the R, G and B data stored in the CCD shift register 103 are shifted and sequentially transmitted to and stored in a memory. The data stored in the memory will be transmitted to an output apparatus.

In the present invention, the outputs of three sensing elements are combined to form one pixel in such a manner that the first pixel ($s_1$) is formed by $R_1$, $G_1$, and $B_1$; the second pixel ($s_2$) is formed by $R_2$, $G_2$, and $B_1$; and the third pixel ($s_3$) is formed by $R_3$, $G_2$, and $B_2$. In general, the (3p−2)-th pixel (i.e., $s_{3p-2}$) is formed by the outputs from sensing elements $R_{2p-1}$, $G^{2p-1}$, and $B_{2p-1}$; the (3p−1)-th pixel (i.e., $s_{3p-1}$) is formed by the outputs from sensing elements $R_{2p}$, $G_{2p}$, and $B_{2p-1}$; and the (3p)-th pixel (i.e., $s_{3p}$) is formed by the outputs from sensing elements $R_{2p+1}$, $G_{2p}$, and $B_{2p}$, where p is a natural number. This is also mode 1. In mode 1, the number of pixels can be increased about 1.5 times as much as that of the conventional art.

Also, the outputs of the sensing elements may be combined in such a manner that the first pixel ($s_1$) is formed by $R_1$, $G_1$, and $B_1$; the second pixel ($s_2$) is formed by $R_2$, $G_1$, and $B_1$; and the third pixel ($s_3$) is formed by $R_2$, $G_2$, and $B_1$. In general, the (3q−2)-th pixel (i.e., $s_{3q-2}$) is formed by the outputs from sensing elements $R_q$, $G_q$, and $B_q$; the (3q−1)-th pixel (i.e., $s_{3q-1}$) is formed by the outputs from sensing elements $R_{q+1}$, $G_q$, and $B_q$; and the (3q)-th pixel (i.e., $s_{3q}$) is formed by the outputs from sensing elements $R_{q+1}$, $G_{q+1}$, $B_q$, where q is a natural number. This is also mode 2. In mode 2, the number of pixels can be increased about 3 times as much as that of the conventional art.

For example, when each of the sensor lines 104a, 104b and 104c has 1000 sensing elements, data for only 1000 pixels can be obtained in the conventional art. However, in the present invention, data for up to 3000 pixels can be obtained. Therefore, it is possible to properly select the number of pixels and extract part of the pixels in accordance with the pixel ratio so that the quality of the image to be outputted can be improved. That is, when the number of pixels of the input image is 1000, the number of pixels read out from the memory is up to 3000. When the number of pixels of the image to be outputted is 1500, the ratio of the pixels of the output image to the pixels read out from the memory is 1500/3000. Hence, N' (the serial number of a pixel to be extracted) is calculated by the equation N'=[N×(3000/1500); N=1, . . . ,1500]. Then, a series of pixels Nos. 2, 4, 6, 8, . . . , 3000 is obtained for the extraction. Further, when the number of pixels of the image to be outputted is 600, the ratio of the pixels of the output image to the pixels read out from the memory is 600/3000. Hence, N' is calculated by the equation N'=[N×(3000/600); N=1, . . . , 600]. Then, a series of pixels Nos. 5, 10, 15, 20, . . . , 3000 is obtained for the extraction. As can be appreciated, in both cases, there is no uneven interval in the series.

Figure 2A:
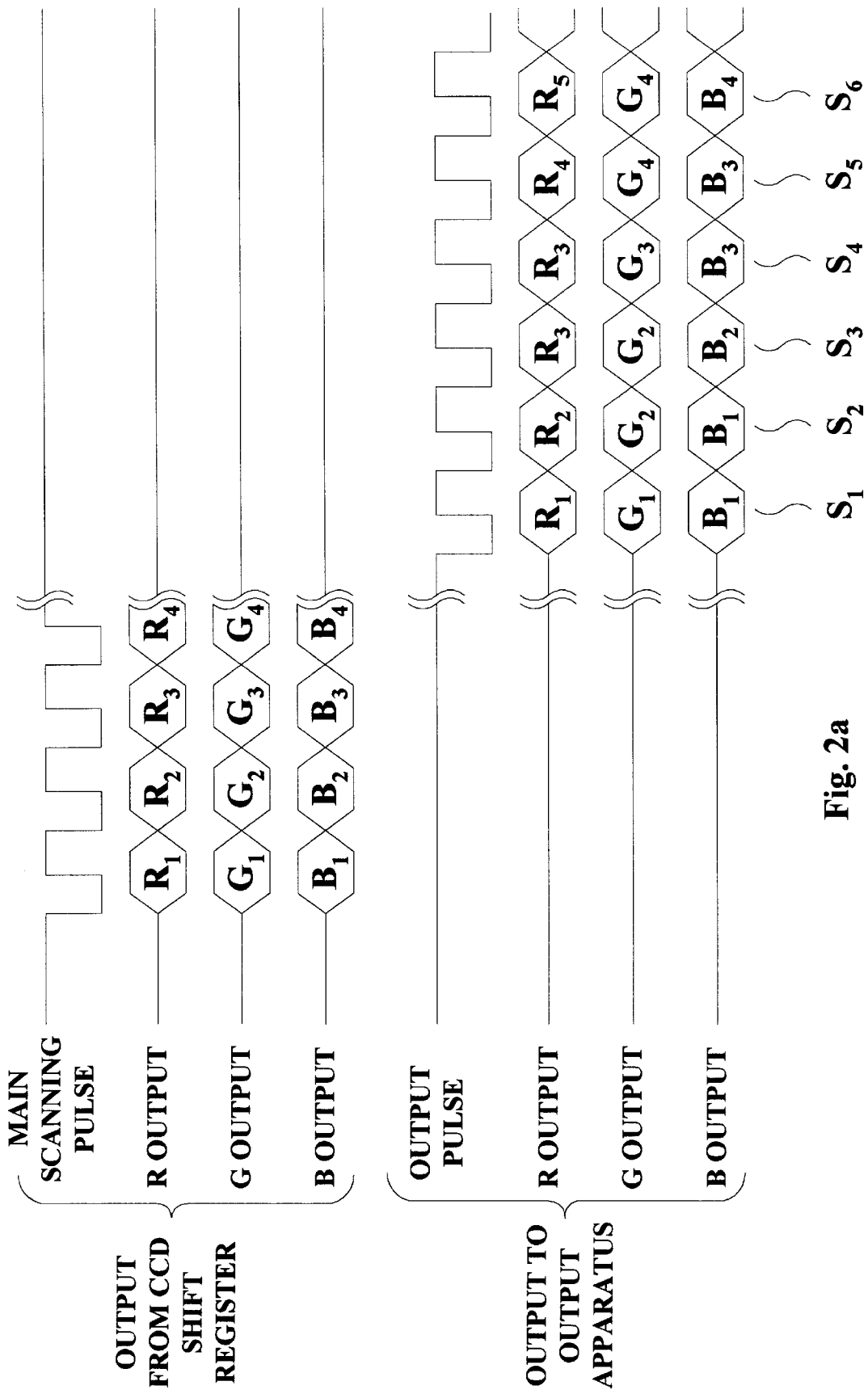
FIG. 2a is a time chart for schematically explaining an output method in mode 1 in the embodiments of the present invention.

FIG. 2a illustrates a time chart of outputs from a CCD shift register and a time chart of outputs from a memory to an output apparatus in mode 1. When a canning pulse signal is supplied to the CCD shift register, outputs $R_I$, $G_I$ and $B_I$ are equentially obtained in synchronism with the scanning pulse signal, where I is a natural number sequentially increasing from 1 to n. Then, the outputs are converted from analog to digital, and sequentially stored in the memory. When an output pulse signal from the output device is supplied to the memory, the data stored in the memory are read out in synchronism with the output pulse signal to sequentially output the first pixel $s_1$ consisting of $R_1$, $G_1$ and $B_1$; the second pixel $s_2$ consisting of $R_2$, $G_2$ and $B_1$; and the third pixel $s_3$ consisting of $R_3$, $G_2$ and $B_2$.

Figure 2B:
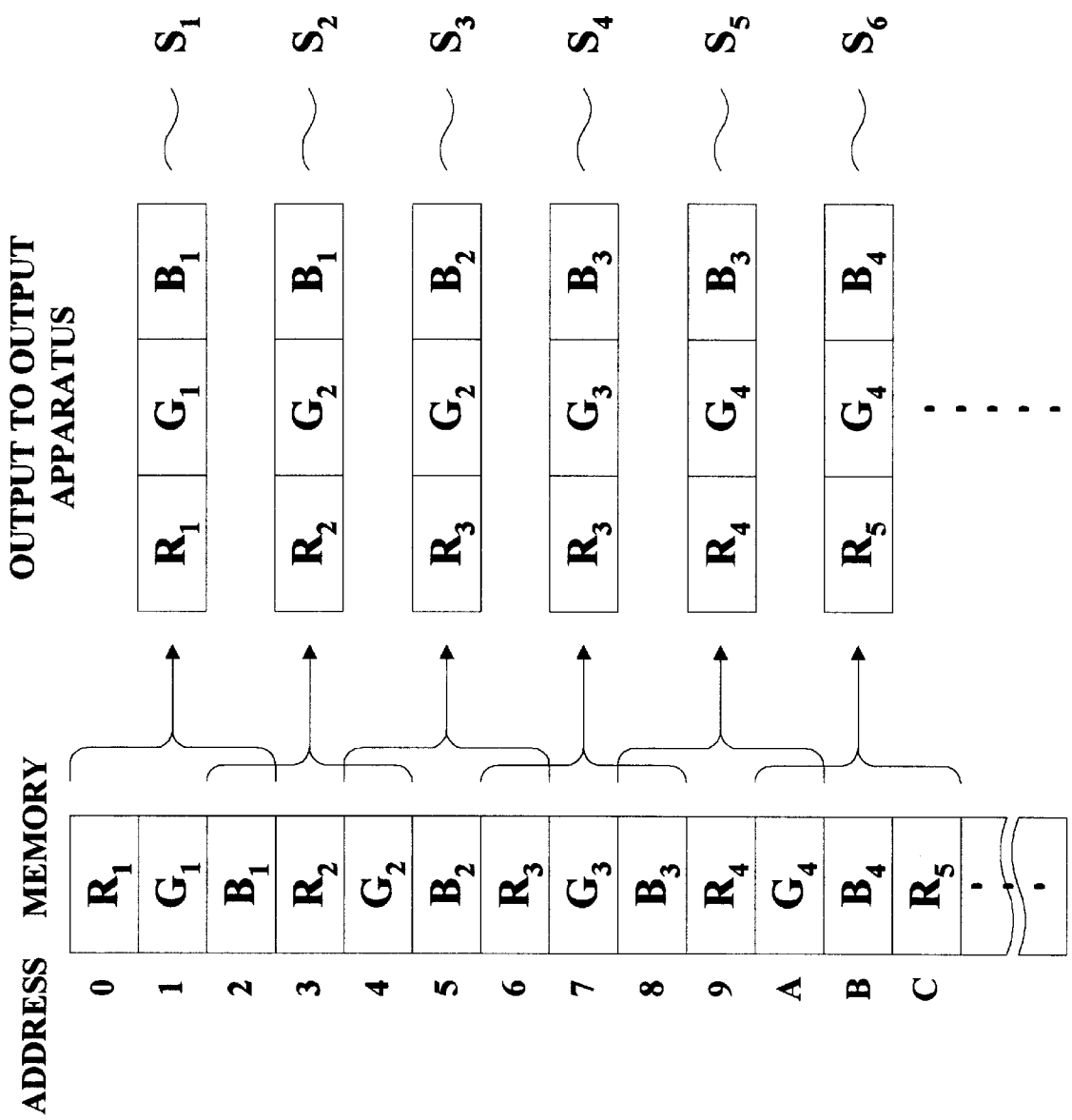
FIG. 2b is a block diagram for schematically explaining the output method in mode 1 in the embodiments of the present invention.

FIG. 2b schematically illustrates a method of outputting data from the memory to the output apparatus to demonstrate the principle of operation in mode 1. As illustrated in FIG. 2b, the data are stored in the memory sequentially, such as $R_1$, $G_1$, $B_1$, $R_2$, $G_2$, $B_2$, . . . . When the data is outputted to the output apparatus, three bytes of data are outputted by increasing the address pointer by two whenever the data for one pixel have been outputted. That is, three bytes of data at address 0 to address 2 are read out to be outputted as the fist pixel $s_1$, then three bytes of data at address 2 to address 4 are read out to be outputted as the second pixel $s_2$. In general, data $R_p$, $G_p$ and $B_p$ are stored at addresses (3p−2), (3p−1), and (3p), respectively in the memory, where p is a natural number increasing from 1 to n. When the data corresponding to the (3p−2)-th pixel $s_{3p-2}$ is outputted, three bytes of data at addresses (6p−6), (6p−5) and (6p−4) are read out. When the data corresponding to the (3p−1)-th pixel $s_{3p-1}$ is outputted, the data at addresses (6p−4), (6p−3) and (6p−2) are read out. When data corresponding to the (3p)-th pixel $s_{3p}$ is outputted, the data at addresses (6p−2), (6p−1) and (6p) are read out.

Although not shown in the drawings, whenever the data for one pixel have been outputted, the reading address may be increased by one to read out three bytes of data in mode 2. In general, when the data corresponding to the (3q−2)-th pixel $s_{3q-2}$ is outputted, three bytes of data at addresses (3q−3), (3q−2) and (3q−1) are read out, where q is a natural number increasing from 1 to n. When the data corresponding to the (3q−1)-th pixel $s_{3q-1}$ is outputted, the data at addresses (3q−2), (3q−1) and (3q) are read out. When data corresponding to the (3q)-th pixel $s_{3q}$ is outputted, the data at addresses (3q−1), (3q) and (3q+1) are read out.

Details of a plurality of embodiments of the image processing system of the present invention will now be described below.

Embodiment 1

Figure 3:
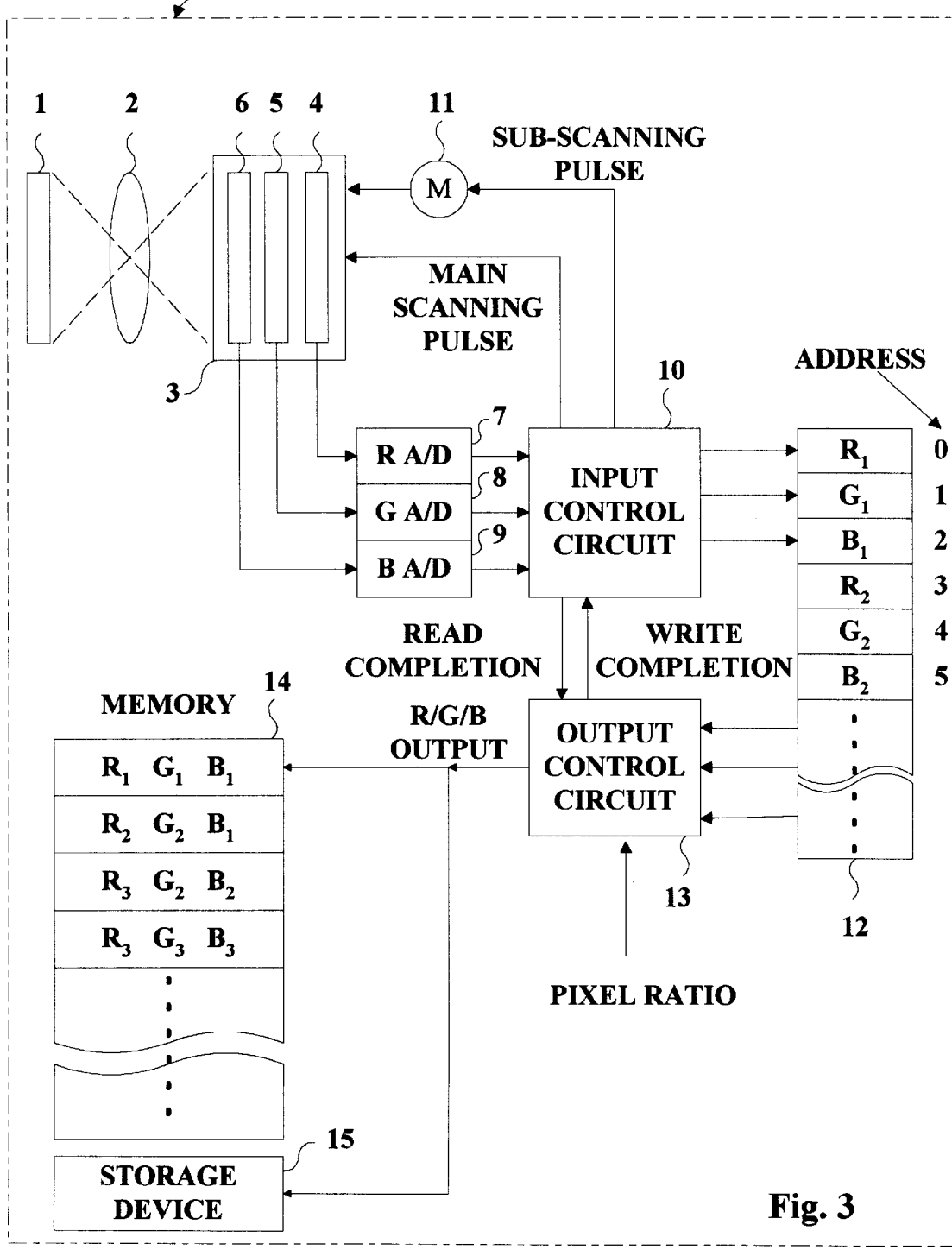
FIG. 3 is a block diagram of an image input and output system of a first embodiment of the present invention.

FIG. 3 illustrates a block diagram of a first embodiment of the present invention. In the first embodiment, the present invention is applied to a film scanner for reading a photographic film by a line-type CCD. An image input and output system 16 in this embodiment are integrally formed by an image input apparatus and an image output apparatus.

An image of a film 1 is formed on a CCD 3 by a lens 2 and converted to an electric signal. The CCD 3 comprises a red CCD 4, a green CCD 5 and a blue CCD 6 respectively corresponding to the three primary colors and outputs their color image signals to analog-to-digital converters (hereinafter called "A/D converter") 7, 8 and 9, respectively. Whenever a predetermined main scanning pulse signal is supplied from an input control circuit 10 to the CCD 4, 5 and 6, the color image signals for one pixel are outputted. Each of the color image signals is separately converted to a digital data by the A/D converters 7, 8 or 9.

The input control circuit 10 sequentially transmits the digital data to a memory 12 as a random access memory (RAM). The digital data is temporally stored at a predetermined address in the memory 12. When one set of digital data for one pixel has been stored, the input control circuit 10 transmits one scanning pulse signal to the CCD 3. For example, the digital data $R_1$, $G_1$ and $B_1$ for the first pixel are stored at addresses 0, 1 and 2, respectively in the memory 12. The digital data $R_2$, $G_2$ and $B_2$ for the second pixel are stored at addresses 3, 4 and 5, respectively in the memory 12 after the input control circuit 10 transmits one scanning signal to the CCD 3.

As described above, the input control circuit 10 alternately repeats outputting of the main scanning pulse signal and storing of the digital data. When the main scanning and storing for one line of the image have been completed, the input control circuit 10 transmits a storage completion signal to an output control circuit 13, and also transmits a sub-scanning pulse signal to a stepping motor 11 so that the stepping motor 11 rotates by a predetermined amount to move the CCD 3 in a transverse direction with respect to the front surface of the film 1. The input control circuit 10 waits for receiving a completion signal from the output control circuit 13 for indicating that the data temporally stored in the memory 12 have been completely read out. Upon receiving the completion signal, the input control circuit 10 repeats storing the A/D-converted data in the memory 12, starting from address 0. A two dimensional image of a color original such as a photographic film can be acquired by repeating the main scanning and sub-scanning.

Referring to a flowchart shown in FIG. 4a, the input control operation of the input control circuit 10 will now be described.

In step S1, storing address $\mathbb{A}$ of the memory 12 is reset to 0. In step 2, the main scanning pulse signal is transmitted to the CCD 3 to output the color image signals R, G and B for one pixel to the A/D converters 7, 8 and 9, respectively. In step S3, the digital data representing red is stored in the memory 12 at address $\mathbb{A}$. In step S4, address $\mathbb{A}$ is increased by one. In step S5, the digital data representing green is stored in the memory 12 at address $\mathbb{A}$. In step 6, address $\mathbb{A}$ is increased by one. In step 7, the digital data representing blue is stored in the memory 12 at address $\mathbb{A}$. In step 8, address $\mathbb{A}$ is increased by one.

In step S9, based on the value of address $\mathbb{A}$, it is determined whether the digital data for one line have been completely stored in the memory 12 or not. If they have been stored, the process goes to step S10. Otherwise, the process goes back to step S2.

In step S10, the storage completion signal is transmitted to the output control circuit 13. In step S11, the sub-scanning pulse signal is outputted to the stepping motor 11 to rotate the stepping motor 11 so that the film 1 is moved to change the relative positions between the film 1 and the CCD 3. When the output control circuit 13 has completely read out the data for one line from the memory 12, the output control circuit 13 transmits a reading completion signal to the input control circuit 10. In step S12, the input control circuit 10 waits for receiving the reading completion signal, and if the signal is received, the process goes to step S13.

In step S13, based on the accumulated number of the sub-scanning signals or the like, it is determined whether the photoelectric converting process for the image of the film 1 has been completed or not, that is, whether the input control has been completed or not. If it has not been completed, the process goes back to step S1 to repeat the same steps as described above.

On the other hand, the output control circuit 13 designates the address of the memory 12, and outputs the digital image data to a display memory 14 or a storage device 15 such as a hard disc or the like. The image data stored in the display memory 14 is used to form a display on a display apparatus (not shown), such as a monitor or the like. The control circuit 13 selects one of the modes, that is, the conventional mode, mode 1 or mode 2, in accordance with the pixel ratio set in the system 16.

Referring to a flowchart shown in FIG. 4b, the output control operation of the output control circuit 13 will now be described.

Figure 4A:
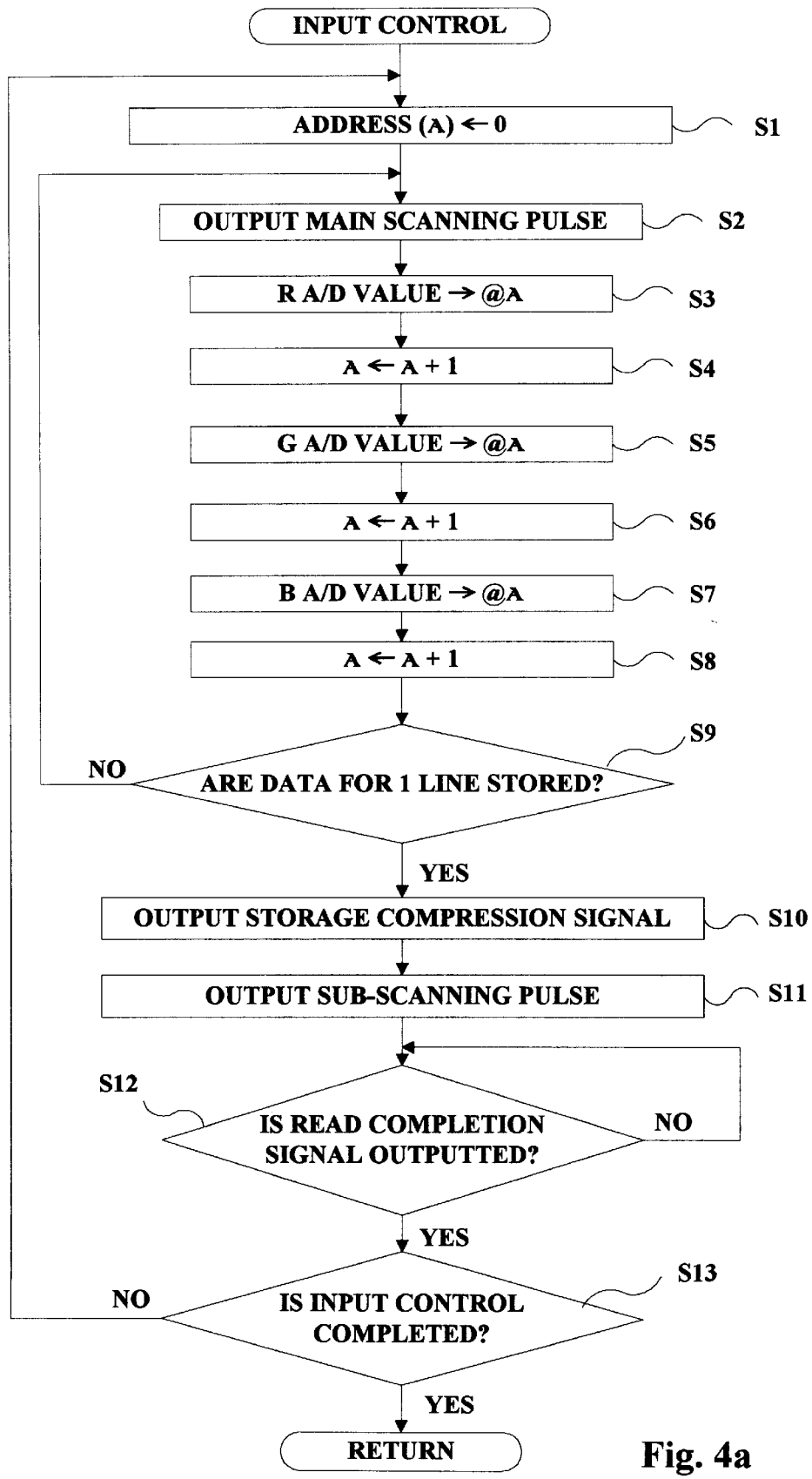
FIG. 4a is a flowchart of an input control process corresponding to an input control circuit in the first embodiment of the present invention.

When the input control circuit 10 transmits the image data for one line to the memory 12, the input control circuit 10 transmits the storage completion signal to the output control circuit 13 in step 10 illustrated in FIG. 4a. In step 20, it is determined whether the storage completion signal has been received or not by the output control circuit 13. If the storage completion signal has not been received, the process in step S20 is repeated. If the storage completion signal has been received, in step S21, address $\mathbb{A}$ is reset to 0. In step S22, a register NEXTC is set to red, the NEXTC being a register for determining which data (red, green or blue) is to be read out next. In step S23, it is determined which color (red, green or blue) corresponds to register NEXTC. If the NEXTC is red, the process goes to step S24; if the NEXTC is green, the process goes to step S30; and if the NEXTC is blue, the process goes to step S36.

In step S24, the digital data designated by address $\mathbb{A}$, as representing red, is transmitted to the memory 14 or the storage device 15. In step S25, the address is increased by one. In step S26, the digital signal designated by address $\mathbb{A}$ is outputted as representing green. In step S27, the address is increased by one. In step S28, the digital signal designated by address $\mathbb{A}$ is outputted as representing blue . In step S29, the register NEXTC is set to blue. Immediately after address $\mathbb{A}$ is reset to 0 in step S21, as a result of this sequence of operations (steps S24–S29), the digital data $R_1$, $G_1$ and $B_1$ temporarily stored in the memory 12 are outputted as image data corresponding to one pixel. Then, the process goes to step S42.

In step S42, based on the value of address $\mathbb{A}$, it is determined whether the digital data for one line have been completely read out or not. If they have not been read out, the process goes to step S23. Since the register NEXTC is set to blue in step S29, the process goes from step S23 to step S36. In step S36, the digital signal designated by the same address $\mathbb{A}$ as in step S28 is outputted as representing blue.

In step S37, address $\mathbb{A}$ is increased by one. In step S38, the digital data designated by address $\mathbb{A}$ is outputted as representing red. In step S39, address $\mathbb{A}$ is increased by one. In step S40, the digital data designated by address $\mathbb{A}$ is outputted as representing green. In step S41, the register NEXTC is set to green. Immediately after the digital data $R_1$, $G_1$ and $B_1$ are outputted, as a result of this sequence of operations (steps S36–S41), the digital data $B_1$, $R_2$ and $G_2$ temporarily stored in the memory 12 are outputted as image data corresponding to one pixel. Then, the process goes to step S42.

Since the register NEXTC is set to green in step S41, the process goes to step S30 via step S42 to step S23. In step S30, the digital signal designated by the same address $\mathbb{A}$ as in step S40 is outputted as representing green. In step S31, address $\mathbb{A}$ is increased by one. In step S32, the digital data designated by address $\mathbb{A}$ is outputted as representing blue. In step S33, address $\mathbb{A}$ is increased by one. In step S34, the digital data designated by address $\mathbb{A}$ is outputted as representing red. In step S35, the register NEXTC is set to red to be processed next. Immediately after the digital data $B_1$, $R_2$ and $G_2$ are outputted, as a result of this sequence of operations (steps S30–S35), the digital data $G_2$, $B_2$ and $R_3$ temporarily stored in the memory 12 are outputted as image data corresponding to one pixel. Then, the process goes to step S42.

If the digital data for one line have not been outputted, the process goes back to step S23, and the same process is repeated. If the digital data for one line have been outputted, the process goes to step S43.

In step 43, the reading completion signal for indicating the completion of reading out the digital data for one line is outputted to the input control circuit 10. The input control circuit 10 detects the signal in step S12 in FIG. 4a. In step S44, based on the number of the reading completion signals or the like, it is determined whether the output control has been completed or not. If it has not been completed, the process goes back to step S20, and the same process is repeated.

As described above, in mode 1, when the image data corresponding to the three primary colors for one pixel are outputted from the memory 12, address $\mathbb{A}$ is increased by two.

In mode 2, when the image data for one pixel are outputted, address $\mathbb{A}$ is increased by one. Specifically, in steps S29, S35 and S41 in the flowchart of FIG. 4b, the register NEXTC is set to green, blue and red, respectively, and next to steps S29, S35 and S41, processes to subtract one from address $\mathbb{A}$ are added.

Although details are not shown in the flowcharts, in the first embodiment, mode 1 or 2 is selected in accordance with the pixel ratio, and the number of the pixels of the image scanned by the color line sensor are increased. Then, part of the pixels are omitted in accordance with the pixel ratio and the remaining pixels are outputted to the output apparatus. For example, if mode 1 is selected, it is determined after steps S29, S35 and S41 whether the pixel should be omitted, and only when it is determined that the pixel is not omitted, the image data of the pixel are outputted to the output apparatus.

Embodiment 2

Figure 5:
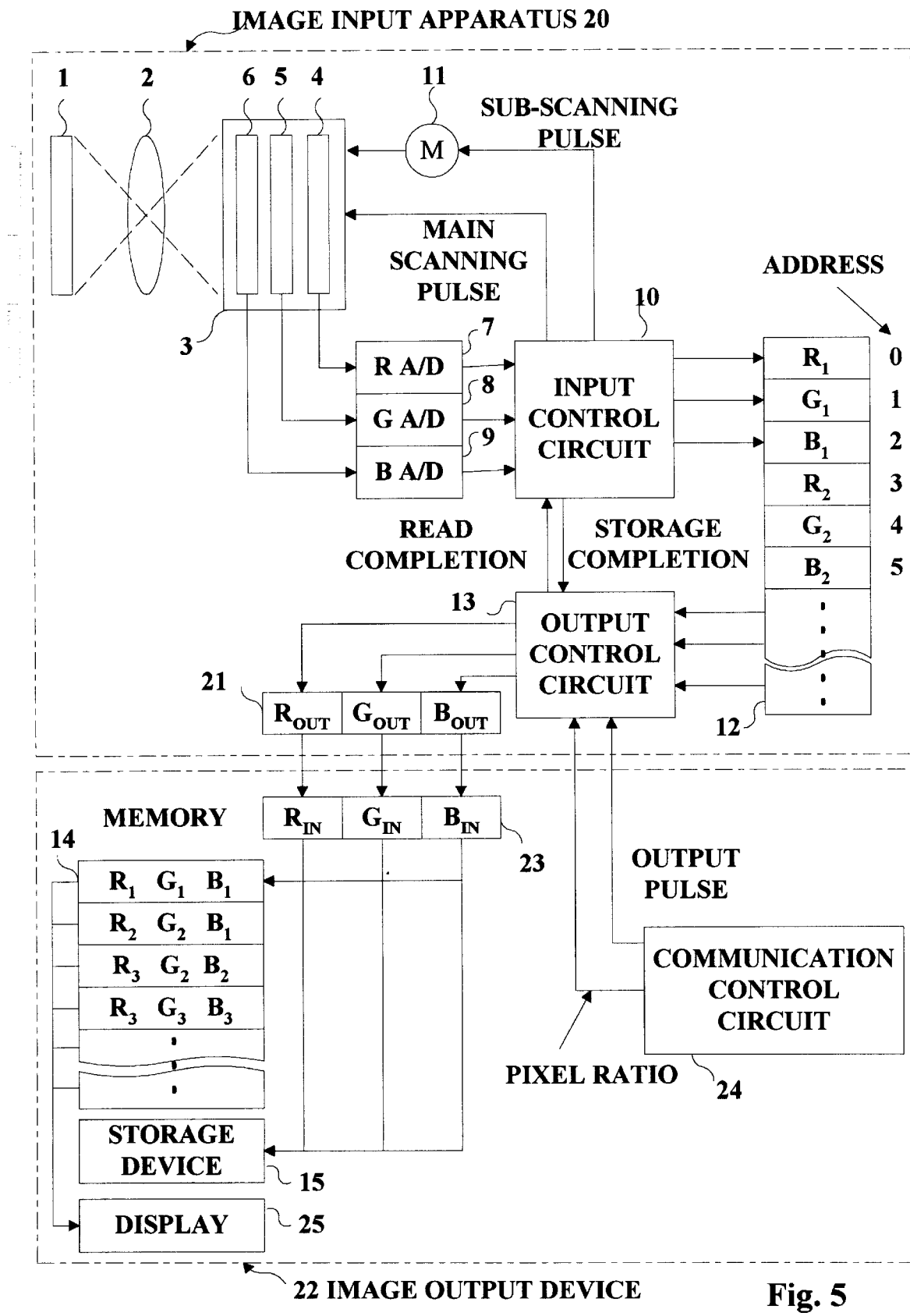
FIG. 5 is a block diagram of an image processing system of a second embodiment of the present invention.

FIG. 5 is a block diagram of a second embodiment of the present invention. The second embodiment is an image processing system comprising an image input apparatus 20 and an image output apparatus 22 such as a personal computer or the like, wherein the image input and output apparati 20 and 22 are separated from each other. The image input apparatus is a film scanner for scanning a photographic film by a line-type CCD.

The image input apparatus 20 comprises an output port 21 for outputting image data R, G and B in accordance with the pixel ratio. Based on communication data or communication signals from a communication control circuit 24 in the image output apparatus 22, a desired pixel ratio is designated in, and an output pulse signal is inputted into, an output control circuit 13. On the other hand, the image output apparatus 22 includes an input port 23 for inputting the image data R, G and B from the image input apparatus 20 to store them in a display memory 14 and a storage device 15. Based on the data stored in the display memory 14, an image can be displayed on a display 25.

The second embodiment is different from the first embodiment in that the image data R, G and B are transmitted from the image input apparatus 20 to the image output apparatus 22. If a microcomputer capable of processing data at high speed is mounted in the image input apparatus 20, data processing in the image output apparatus 22 such as a personal computer can be reduced, and the smaller the pixel ratio is, the faster the data can be transmitted. Especially, when a microcomputer of a reduced instruction set computer (hereinafler called "RISC") type is adopted as the microcomputer for controlling the image input apparatus 20, the image input apparatus 20 can be compact and low-priced and process the data at high speed.

Figure 6:
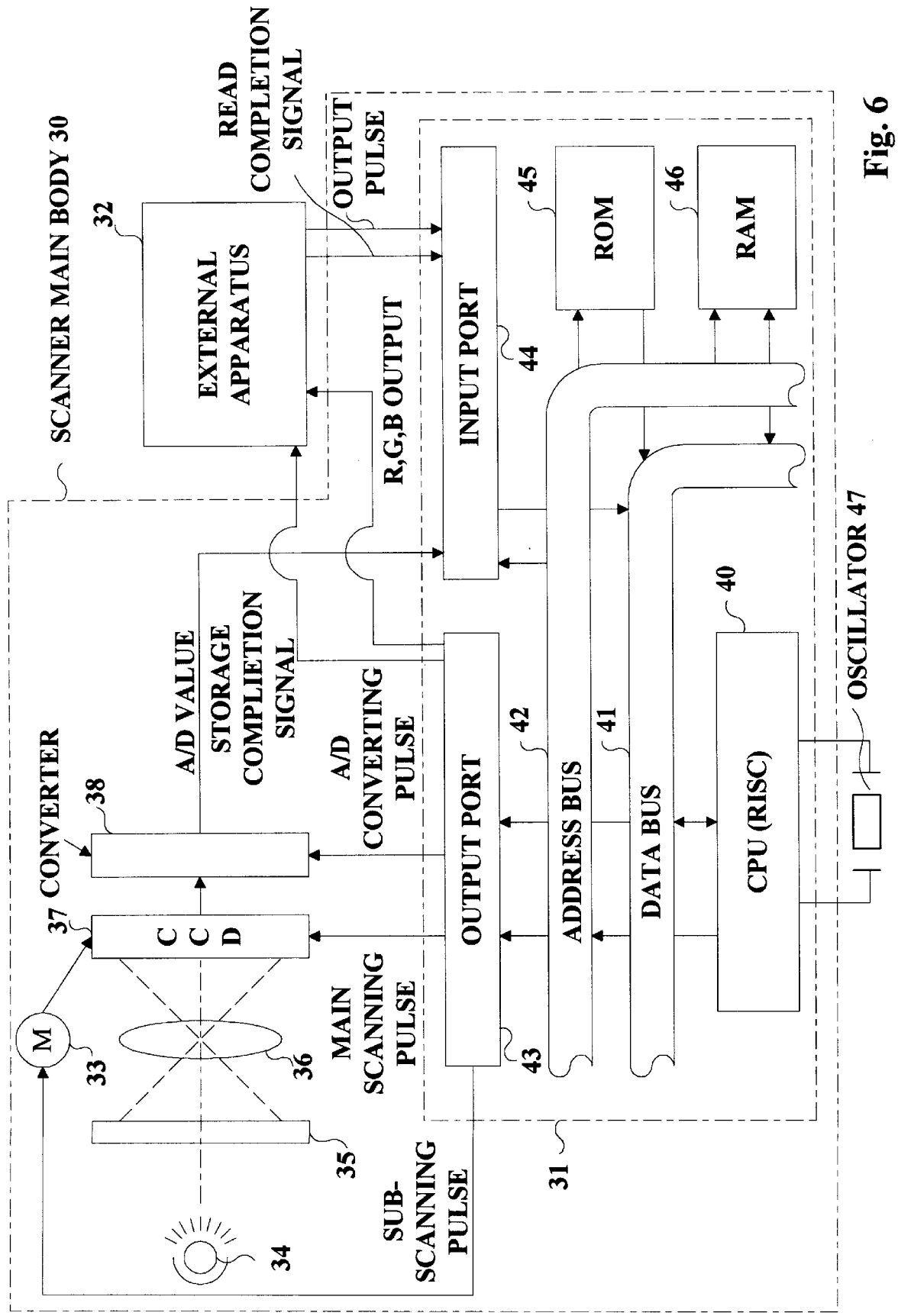
FIG. 6 is a circuit block diagram including a microcomputer of a reduced instruction set computer type in a film scanner of the second embodiment of the present invention.

FIG. 6 illustrates a circuit block diagram of a film scanner using a RISC-type one-chip microcomputer including a read only memory (ROM) and a random access memory (RAM).

The RISC can execute one command in a cycle of frequency of an oscillator (not shown). On the other hand, a complexed instruction set computer (hereinafter called "CISC") executes in four cycles of frequency of an oscillator. For example, when the frequency is 20 MHz, the RISC can execute one command per 50 nano-seconds, but the CISC spends 200 nano-seconds. Thus, the RISC can perform both input and output controls (illustrated in FIGS. 4a and 4b), but it is very difficult for the CISC to do so.

Further, when the RAM 46 included in the RISC 31 is used for a memory for storing and reading the image data R, G and B, the RISC 31 is not loaded to access an external memory so that the data processing speed is faster. Generally, when an external memory is used, the microcomputer is loaded for every access to the memory so that the whole data processing time tends to be longer.

In a scanner main body 30 illustrated in FIG. 6, a predetermined control program (coded in an executable form) is stored in a ROM 45. According to the program, an output port 43 outputs signals to implement the main scanning control of a CCD 37, the sub-scanning control of a stepping motor 33, the A/D converting control of an A/D converter 38, the data transmission from the scanner main body 30 to an external apparatus 32, the output of a storage completion signal, or the like.

Further, an input port 44 inputs the data from the CCD 37 converted by the A/D converter 38, the output pulse signal and a reading completion signal from the external apparatus 32, or the like. The data from the CCD 37 converted by the A/D converter 38 are stored in the RAM 46 in the same order as outputted from the CCD 37. In accordance with the output pulse signal from the external apparatus 32, an address is set so that the data stored in the RAM 46 is read out. One-byte data R, G or B may be outputted from the output port 43 (hereinafter called "output mode 1"), or three-byte data R, G and B may be outputted (hereinafter called "output mode 2"). In the second embodiment, the data R, G or B is one byte. Therefore, the data R, G and B for one pixel of the image are three bytes. When a highly resolved image is required, the data can be more than 8 bits. In contrast, when a low resolved image is acceptable, the data can be less than 8 bits.

Figure 4B:
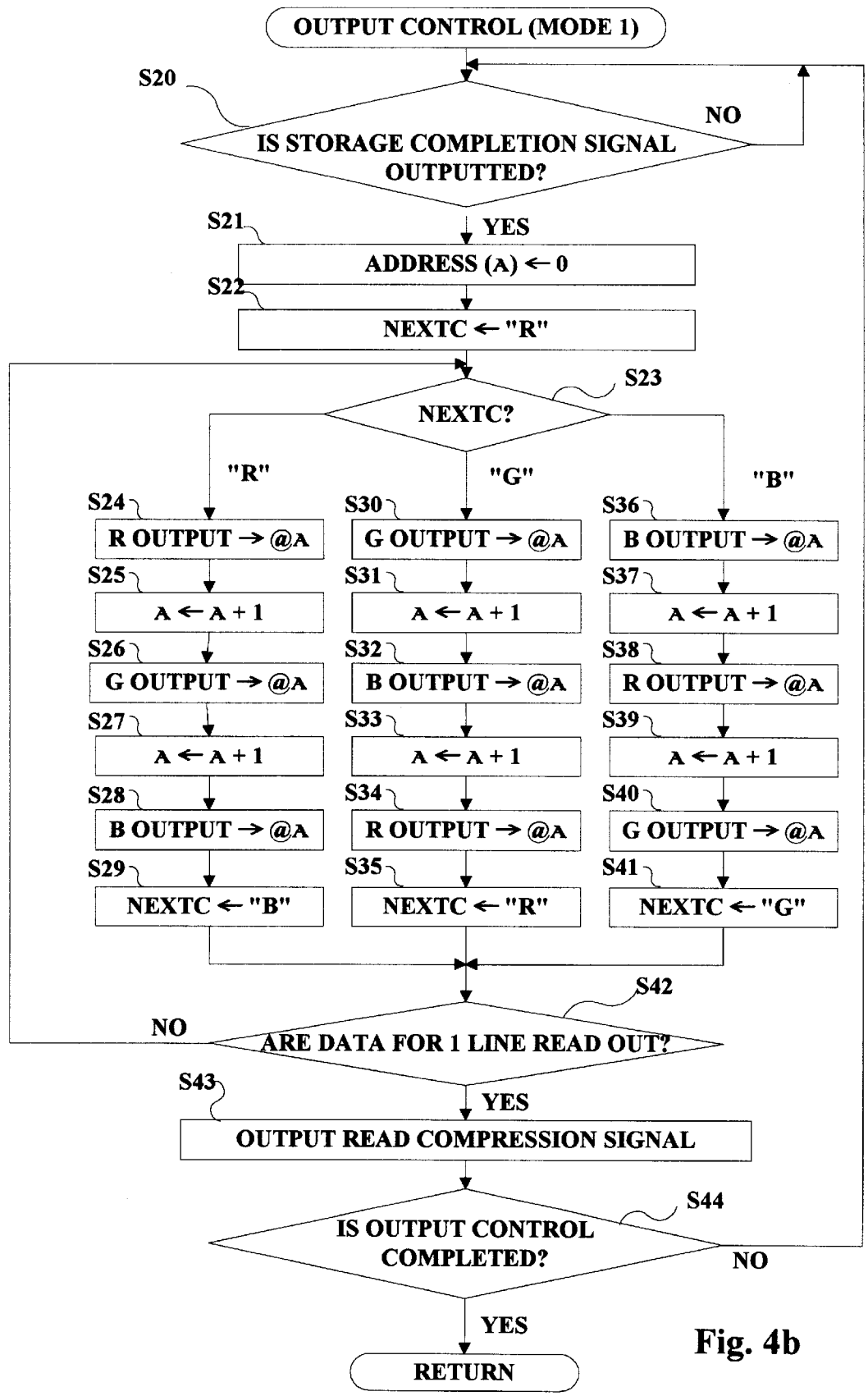
FIG. 4b is a flowchart of an output control process corresponding to an output control circuit in the first embodiment of the present invention.

The data storing process is implemented according to the flowchart illustrated in FIG. 4a, and the data reading process is implemented according to the flowchart illustrated in FIG. 4b. The output pulse signal from the external apparatus 32 is a signal for synchronizing with the timing for reading data. Although not illustrated in FIG. 4b, the output pulse signal is detected for every data reading so that the data can be transmitted safely and surely. For that purpose, a step of waiting for the output pulse signal may be added just before steps S24, S26, S28, S30, S32, S34, S36, S38 and S40 in output mode 1, and just before step S23 in mode 2. If the data transmission speed is predetermined by the scanner 30 and the external apparatus 32, the output pulse signal and its detection are not necessary.

Embodiment 3

Figure 7:
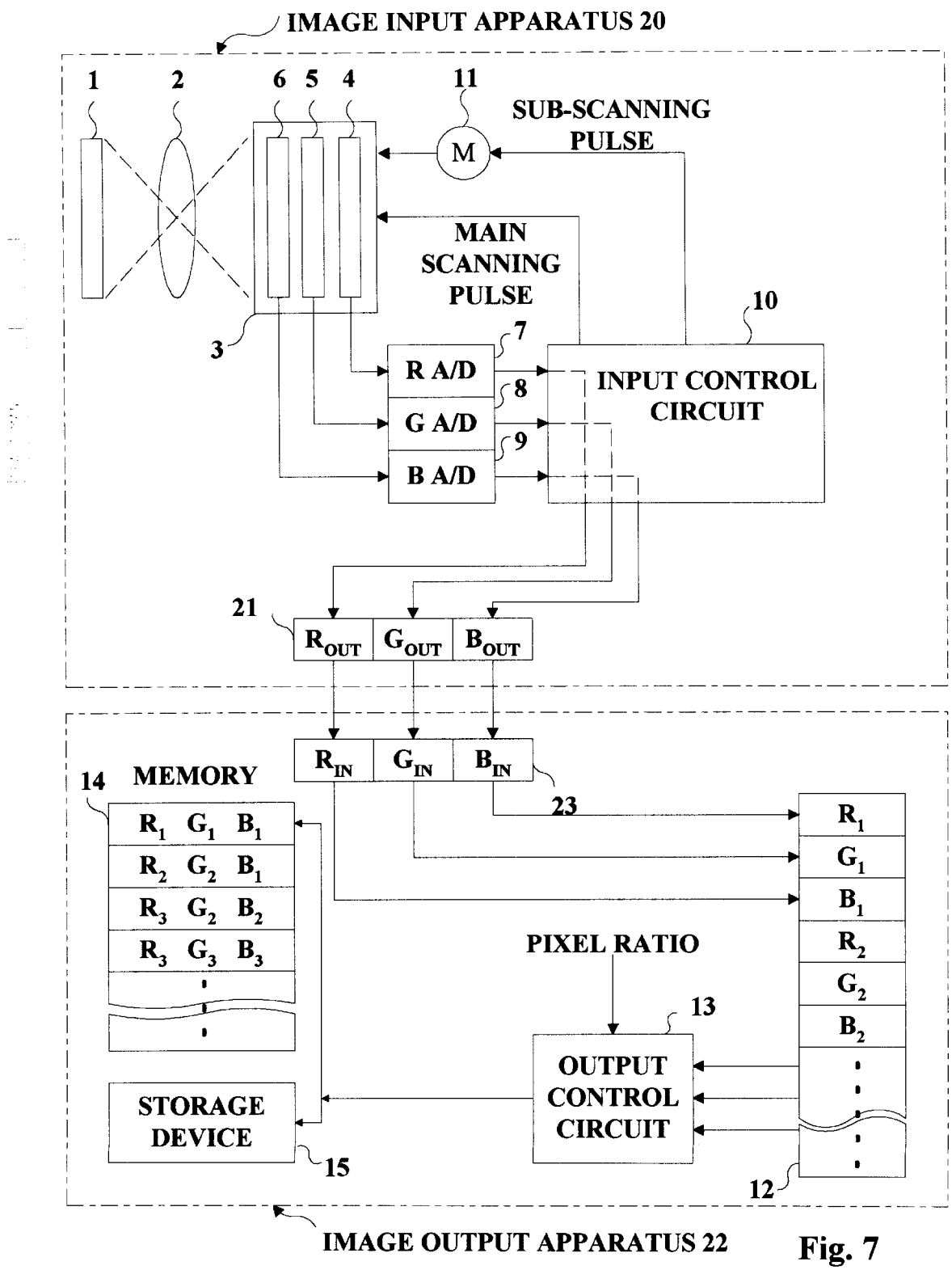
FIG. 7 is a block diagram of an image processing system of a third embodiment of the present invention.

FIG. 7 is a block diagram of a third embodiment of the present invention. The third embodiment is a film scanner for scanning a photographic film with a line-type CCD. The film scanner comprises an image input apparatus 20 and an image output apparatus 22 such as a personal computer or the like. The image input and output apparatus 20 and 22 are separated from each other.

The image input apparatus 20 comprises an output port 21 for outputting A/D converted data R. G and B to the image output apparatus 22 as they are. The image output apparatus 22 has an input port 23 for inputting the data R, G and B to store them in a memory 12.

The third embodiment is different from the second embodiment in that a number of sets of data R, G and B corresponding to the pixel ratio are generated within the image output apparatus 22. Therefore, the image input apparatus 20 does not comprise an output control circuit, and the image output apparatus 22 does not comprise a communication control circuit. Further, the memory 12 is included in the image output apparatus 22 (i.e., an external apparatus), not in the image input apparatus 20 but.

The data R, G and B are stored directly in the memory 12 via the input port 23 of the image output apparatus 22. The image output apparatus 22 calculates a reading address based on a desired pixel ratio, and outputs the data to a display memory 14 or a storage device 15. This output control is implemented basically in accordance with the flowchart illustrated in FIG. 4b.

Embodiment 4

Figure 8A:
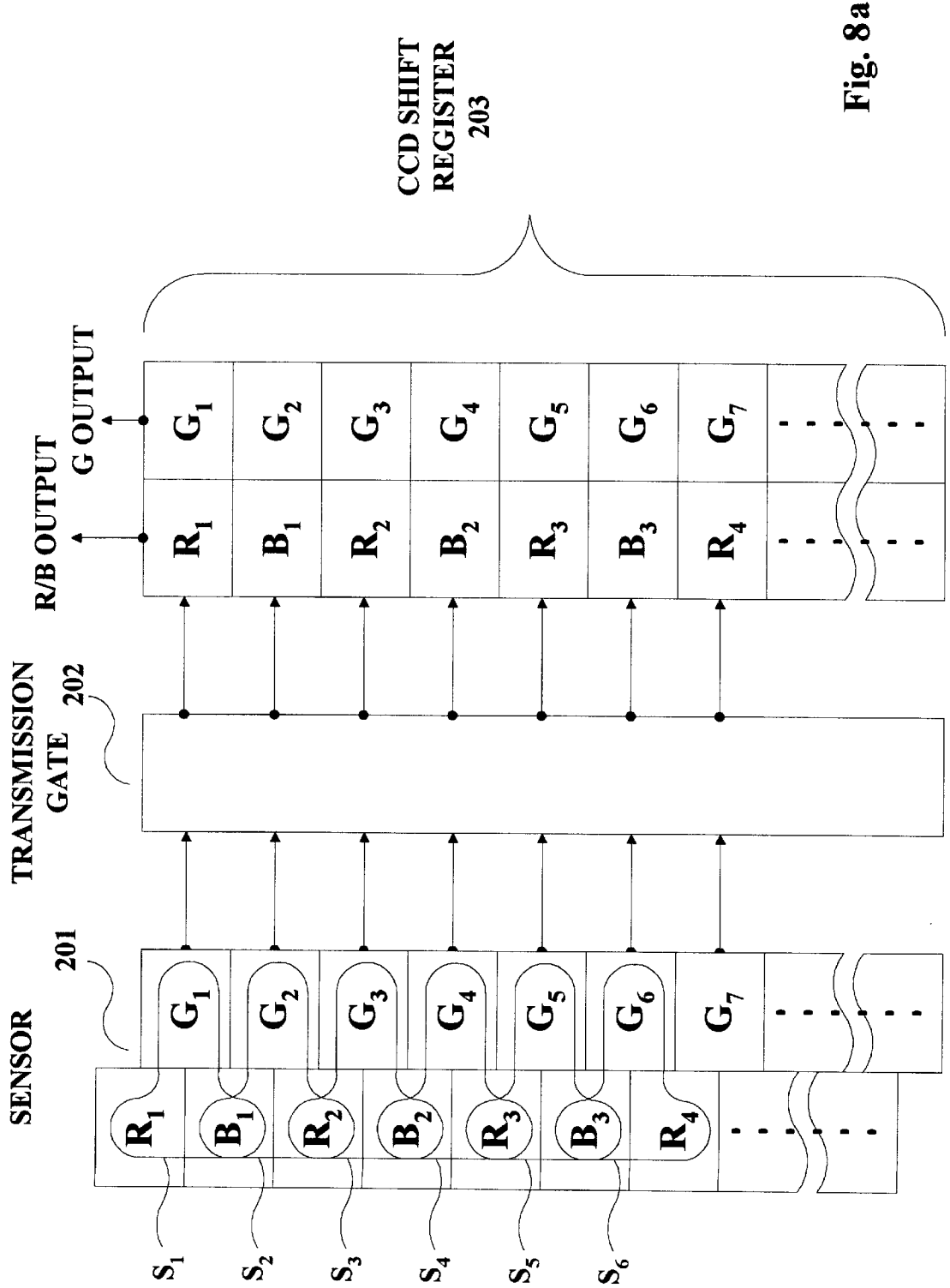
FIG. 8a is a block diagram of a CCD of a two-line type used in a fourth embodiment of the present invention.

The image processing systems in the first, second and third embodiments adopt the one-line type CCD or the three-line type CCD. However, a two-line type CCD as illustrated in FIG. 8a can also be used.

The two-line type CCD 201 comprises a line of sensing elements for sensing green and a line of sensing elements alternately arranged for sensing red and blue. Both lines are parallel to each other, and the sensing elements for red and blue and the sensing elements for green are arranged staggeringly. Accordingly, a CCD shift register 203 also comprises two lines; one line is for green data; and the other line is for red and blue data. The green data is outputted from one terminal; and the red and blue data are alternately outputted from another output terminal.

Just like the second and third embodiments, a fourth embodiment of the present invention comprises an image input apparatus and an image output apparatus, in which the image input and output devices being are separated from each other. However, the image input and output devices may be integrated with each other.

Figure 8B:
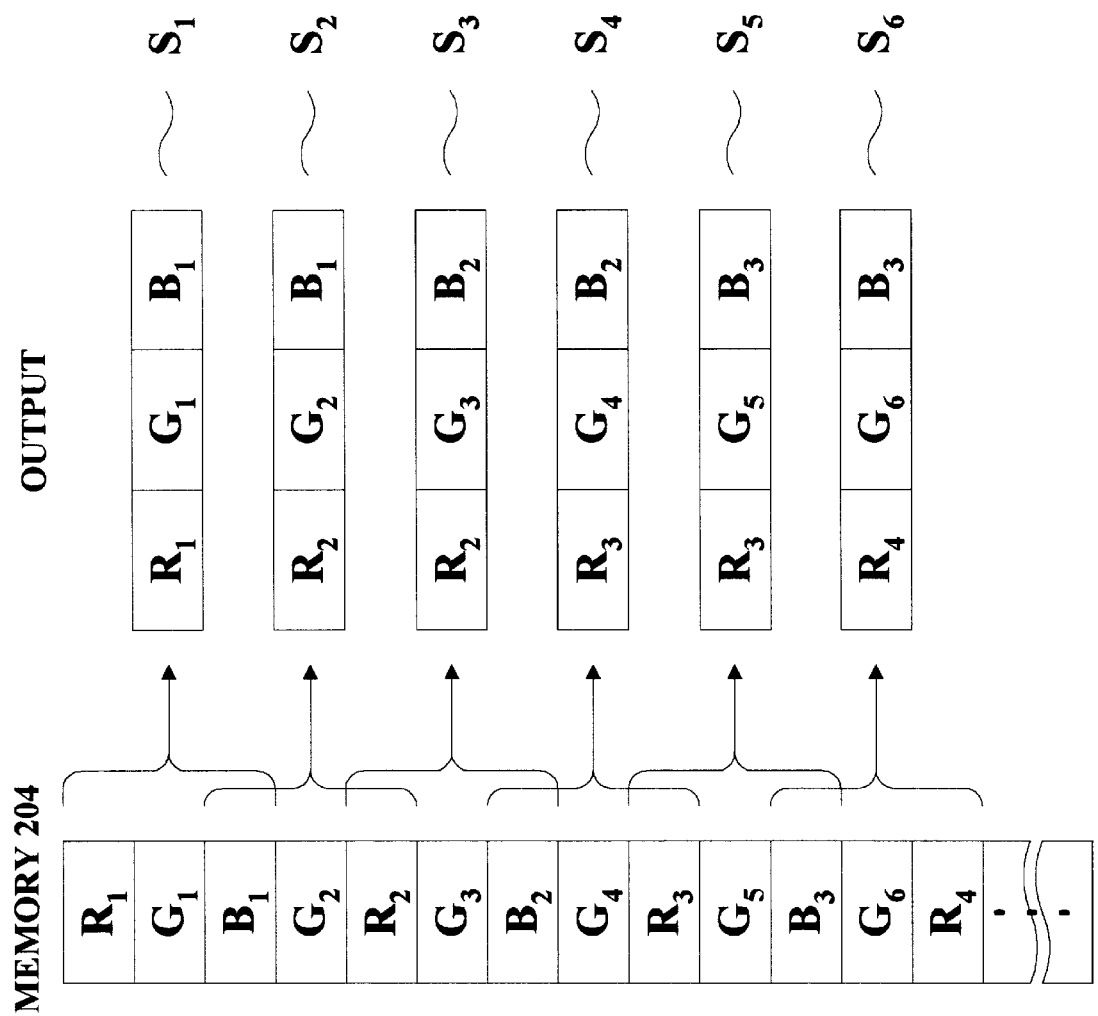
FIG. 8b is a block diagram showing a memory and an output method of the fourth embodiment and FIG. 8c is a time chart of output processing of the fourth embodiment.
Figure 8C:
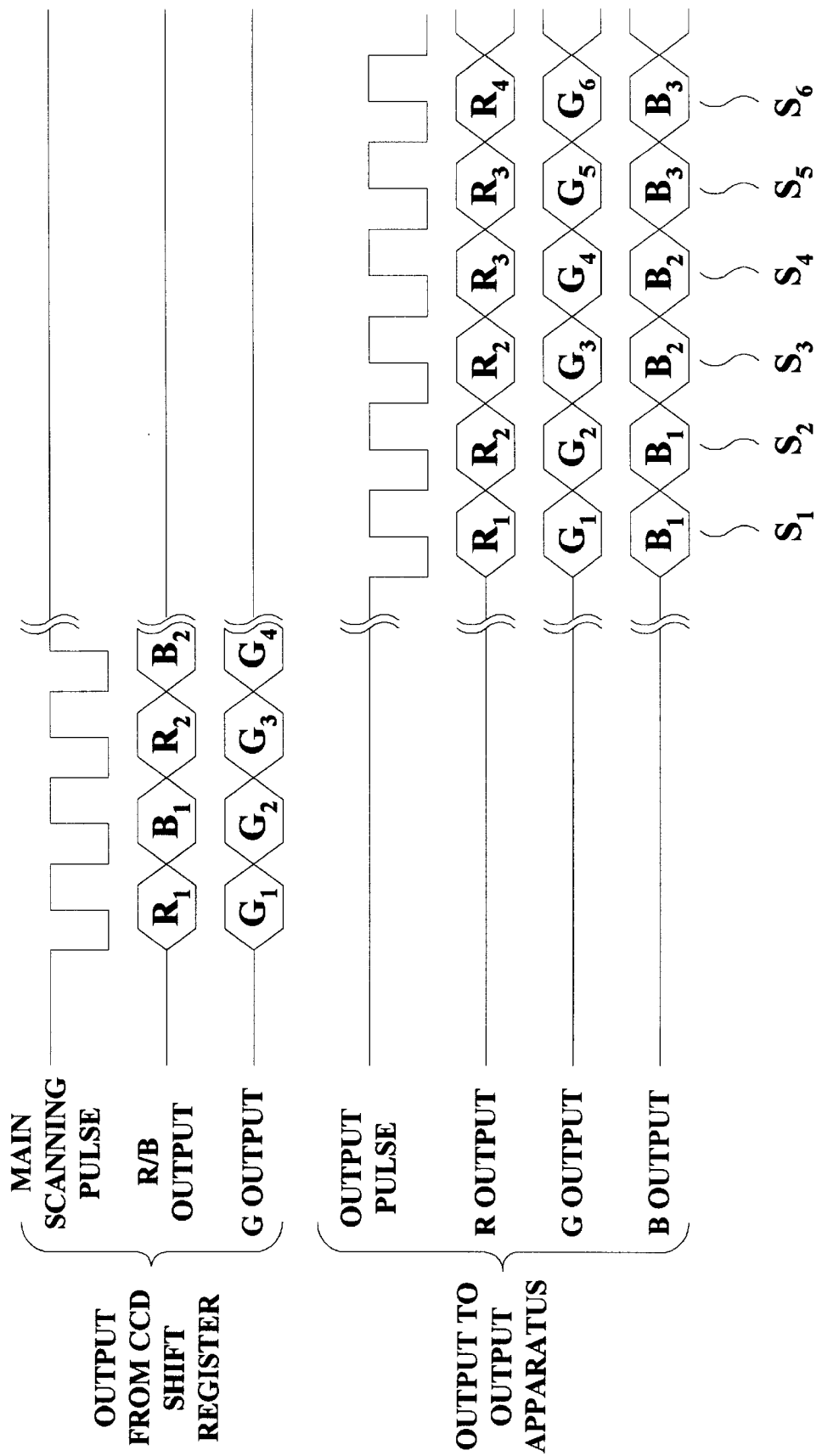

FIG. 8b illustrates a memory 204 and an output method, and FIG. 8c illustrates a time chart of output processing.

FIG. 8b is different from FIG. 2b in that the data are stored in the memory 204 in the order of $R_1$, $G_1$, $B_1$, $G_2$, $R_2$, $G_3$, $B_2$, $G_4$, $R_3$, .... This is because, as illustrated in the time chart in FIG. 8c, whenever a main scanning pulse signal is fenerated, the data corresponding to red and green, and the data corresponding to blue and green are alternately outputted.

Figure 9A:
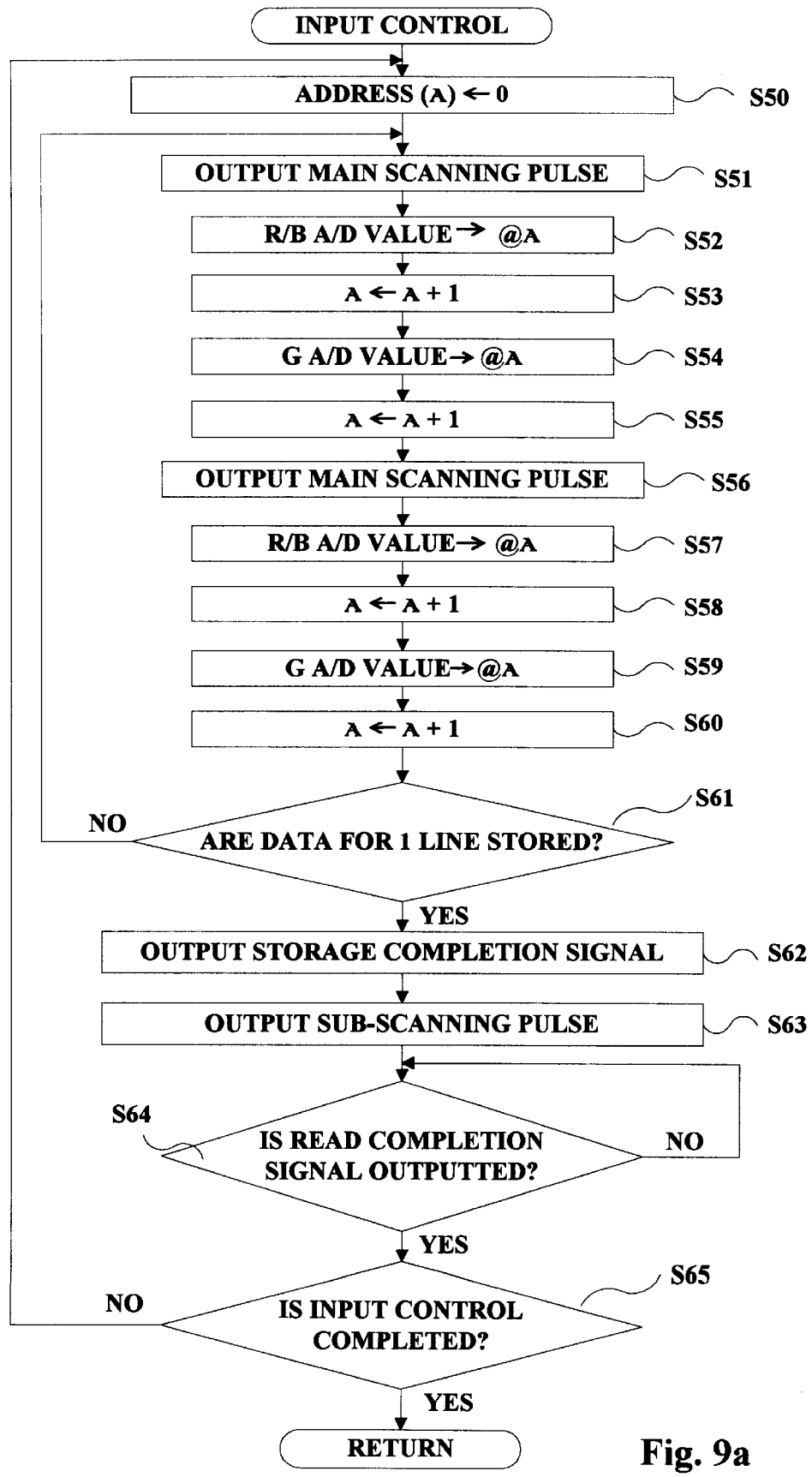
FIG. 9a is a flowchart of an input control process corresponding to the fourth embodiment.
Figure 9B:
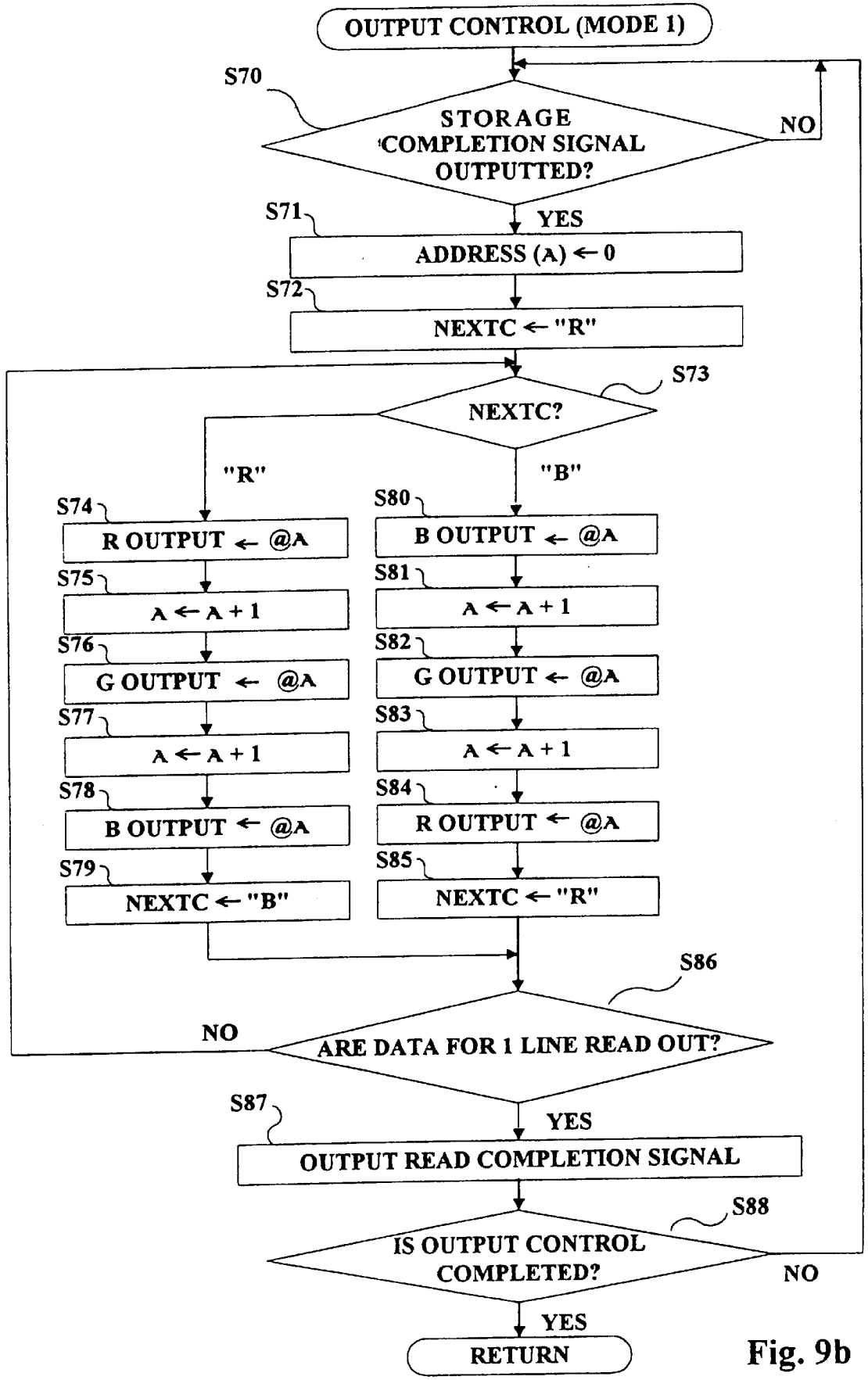
FIG. 9b is a flowchart of an output control process corresponding to the fourth embodiment.

FIGS. 9a and 9b illustrate input and output control operations in the fourth embodiment. FIG. 9a is a flowchart of an input control operation of the input control circuit 10 and different from FIG. 4a in the following points: In the fourth embodiment, the data corresponding to red and blue are alternately outputted from the R/B output terminal. Accordingly, after the first main scanning pulse signal is outputted in step S51, the digital data representing red is transmitted to the memory 204 in step S52. Further, after the second main scanning pulse signal is outputted in step S56, the digital data representing blue is transmitted to the memory 204 in step S57.

Therefore, the flowchart of FIG. 9a will be explained in detail. In step S50, address $A$ is reset to 0. In step S51, the main scanning pulse signal is transmitted to the CCD to output an analog signal from the sensor 201 to the A/D converter. In step S52, the digital data representing red from the A/D converter is stored in the memory 204 at address $A$.

In step S53, address $A$ is increased by one. In step S54, the digital data representing green is stored in the memory 204 at address $A$.

In step S55, address $A$ is again increased by one. In step S56, the main scanning pulse signal is transmitted to the CCD to output an analog signal from the sensor 201 to the A/D converter. In step S57, the digital data representing blue from the A/D converter is stored in the memory 204 at address $A$. In step S58, address $A$ is increased by one. In step S59, the digital data representing green is stored in the memory 204 at address $A$. In step S60, address $A$ is increased by one.

In step S 61, based on the value of address $A$, it is determined whether the digital data for one have been completely stored in the memory 204 or not. If they have been completely stored, the process goes to step S62. Otherwise, the process goes back to step S51.

In step S62, since the image data for one line have been stored in the memory 204, storage completion signal is transmitted to the output control circuit 13. In step S63, in order to change the relative position of the sensor with respect to the photographic film, a sub-scanning pulse signal is transmitted to a motor (not shown). In step S64, it is determined whether a reading completion signal has been outputted from the output control circuit 13 or not. If it has been outputted, the process goes to step S65. Otherwise, the process is repeated. In step S65, based on the accumulative number of the sub-scanning pulse signals, it is determined whether the input control has been completed or not. If it has been completed, the process exits from the routine. Otherwise, the process goes back to step S50 to repeat the same processes.

FIG. 9b is a flowchart illustrating an output control operation in the fourth embodiment and different from FIG. 4b in that either red or blue is set in a register NEXTC. Details of the output controlling operation will now be described.

In step S70, it is determined whether the storage completion signal has been outputted from the input control circuit 10 or not. If the signal has not been outputted, the process is repeated. Otherwise, the process goes to step S71. In step S71, address $A$ is reset to 0. In step S72, the register NEXTC is set to red. In step S73, it is determined whether the register is red or blue. If it is red, the process goes to step S74. If it is blue, the process goes to step S80.

In step S74, the data designated by address $A$ is outputted as representing R. In step S75, address $A$ is increased by one. In step S76, the data designated by address $A$ is outputted as representing G. In step S 77, address $A$ is further increased by one. In step S78, the data designated by address $A$ is outputted as representing B. In step S79, the register NEXTC is set to blue.

In step S86, based on the value of address $A$, it is determined whether the image data for one line have been completely outputted or not. If the data have been outputted, the process goes to step S87. Otherwise, the process goes back to step S73. When the process goes from step S79 to step S73 via step S86, the process goes to step S80 since the register NEXTC has been set to blue in step S79.

In step S80, the data designated by address $A$ is outputted as representing B. In step S81, address $A$ is increased by one. In step S82, the data designated by address $A$ is outputted as representing G. In step S83, address $A$ is further increased by one. In step S84, the data designated by address $A$ is outputted as representing R. In step S85, the register NEXTC is set to red.

In step S86, based on the value of address $A$, it is determined whether the image data for one line have been completely outputted or not. If the data have been outputted, the process goes to step S87. Otherwise, the process goes back to step S73. When the process goes from step S85 to step S73 via step S86, the process goes to step S74 since the register NEXTC has been set to red in step S85.

In step S87, the signal is transmitted to the input control circuit 10. In step S88, based on the number of the read completion signals or the like, it is determined whether the output control has been completed or not. If it has been completed, the process exits from the routine. Otherwise, the process goes back to step S70.

Embodiment 5

Figure 10A:
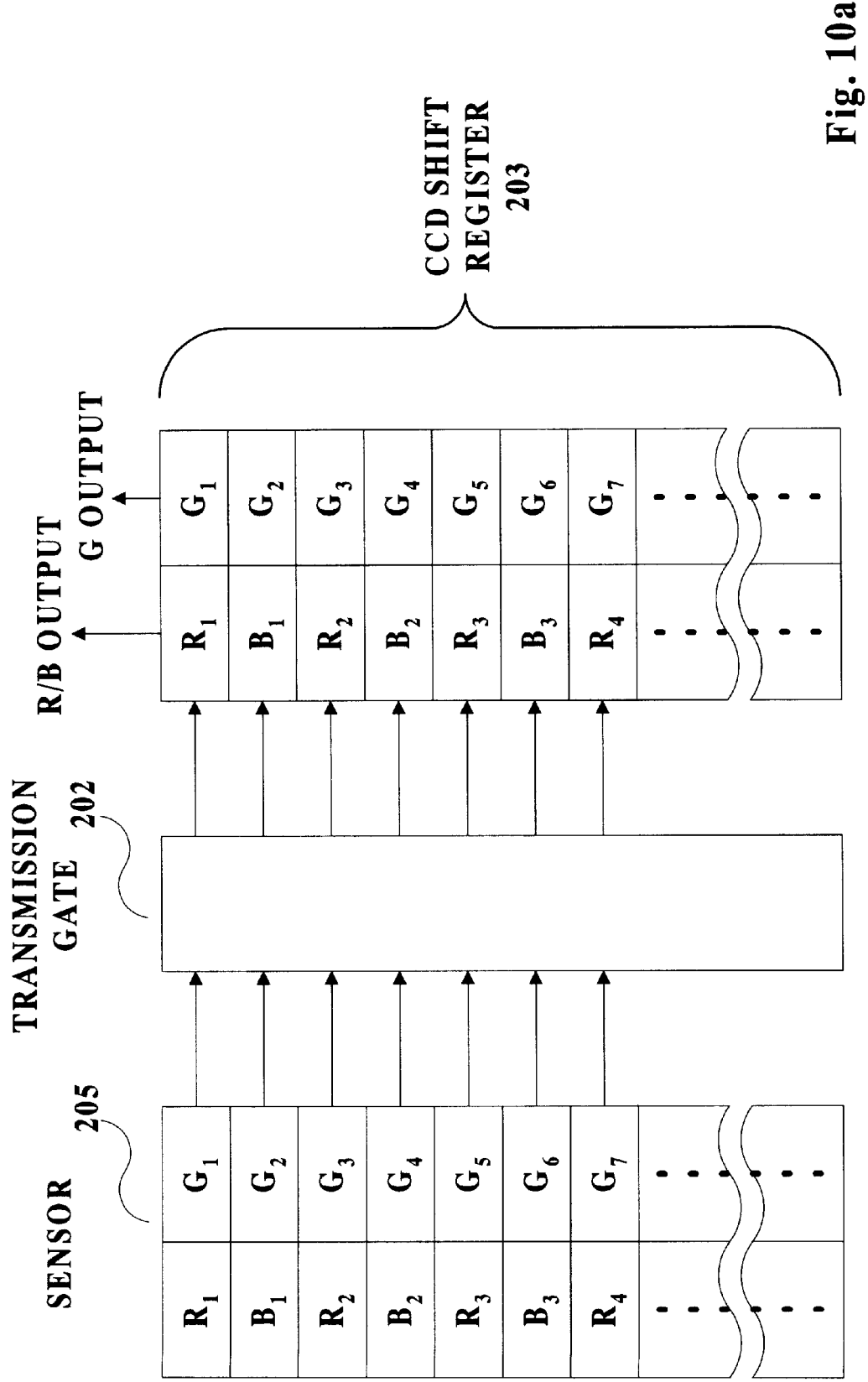
FIG. 10a is a block diagram of a CCD of a two-line type used in a fifth embodiment of the present invention.

FIGS. 10a, 10b, 10c and 11 relate to a fifth embodiment of the present invention, which uses a modification of the two-line type CCD in the fourth embodiment. Just like in the fourth embodiment, the two-line type CCD 205 of the fifth embodiment comprises a line of sensing elements alternately arranged for sensing red and blue, and a line of sensing elements for sensing green. However, in the fourth embodiment, the sensing elements for red and blue and the sensing elements for green are arranged staggeringly, while in the fifth embodiment, as illustrated in FIG. 10a, the sensing elements for red and green and the sensing elements for green are arranged side by side. Also in this embodiment, the image input apparatus and the image output apparatus may be integrated with or separated from each other.

Figure 10B:
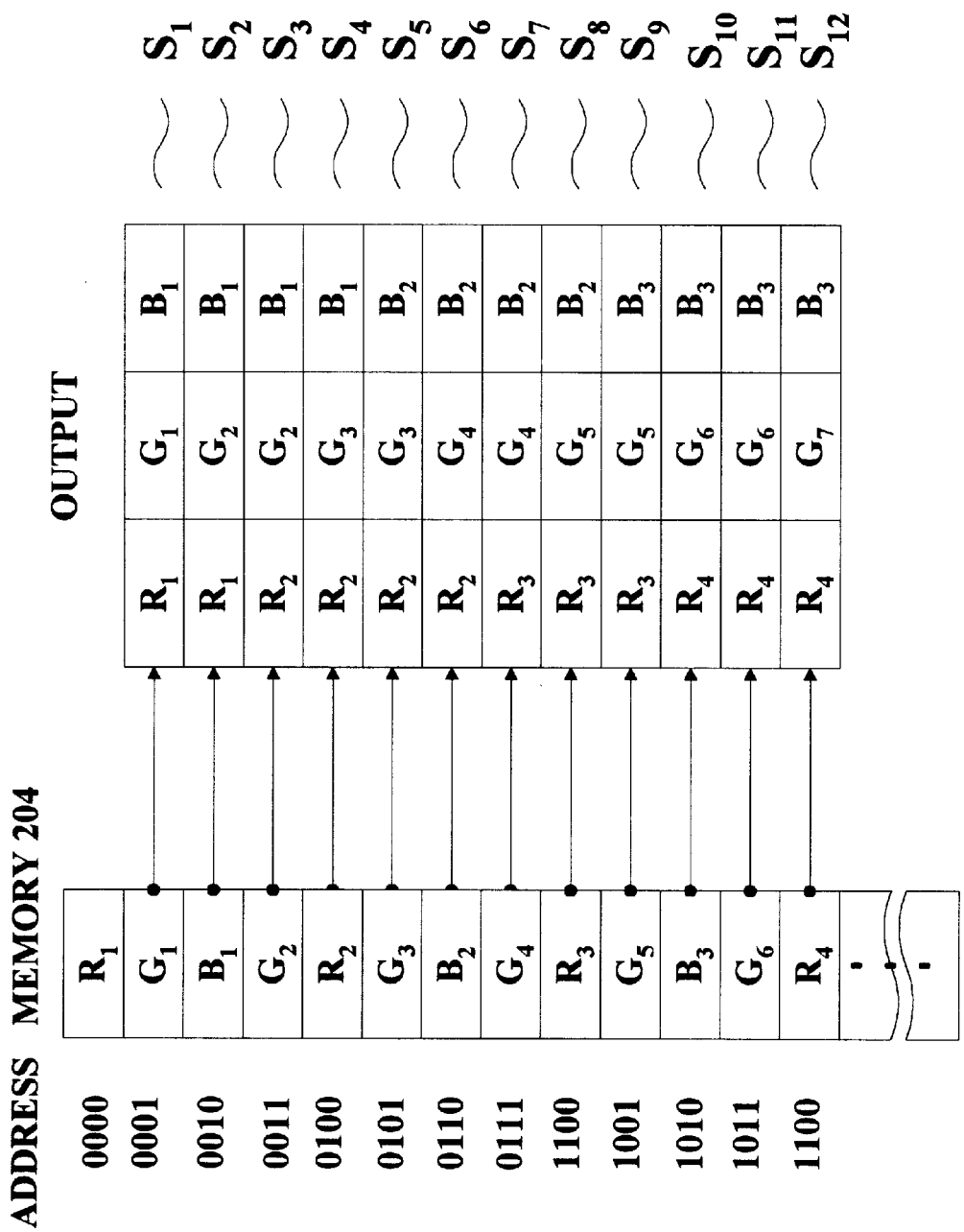
FIG. 10b is a block diagram showing a memory and an output method when the pixel ratio is 2 in the fifth embodiment.
Figure 10C:
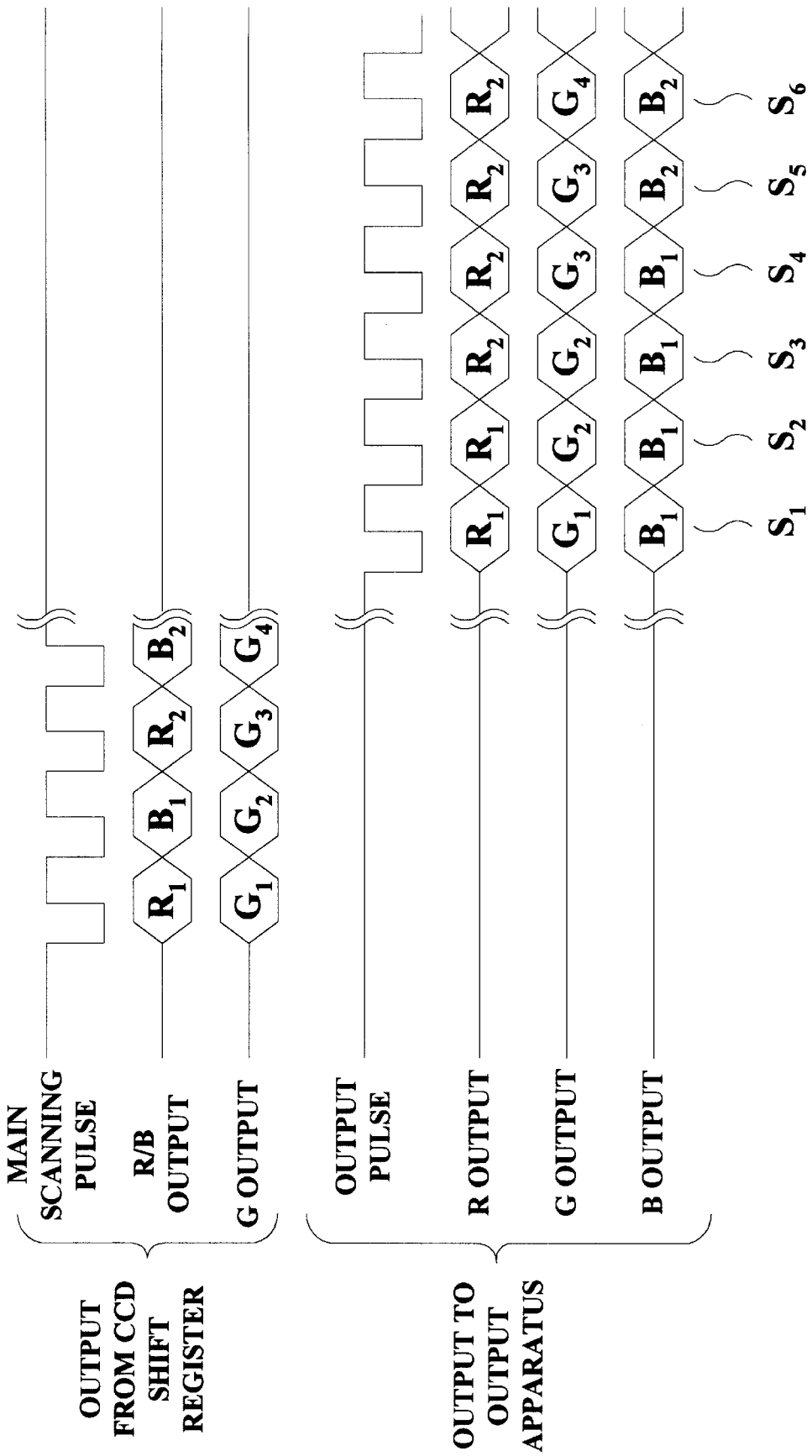
FIG. 10c is a time chart of output processing in the fifth embodiment.

FIG. 10b illustrates the structure of a memory, and an output method when the pixel ratio is 2, that is, the number of pixels of an image to be outputted is two times as much as those of an image scanned by the CCD sensor. FIG. 10c is a time chart of the output operation. FIG. 10b is different from FIG. 8b in the combination of data R, G and B read out from the memory 204 to form one pixel. The order of the data stored in the memory 204 is the same as that illustrated in FIG. 8b. Therefore, since the input operation of the fifth embodiment is the same as that illustrated in FIG. 9a, its description is omitted.

Figure 11:
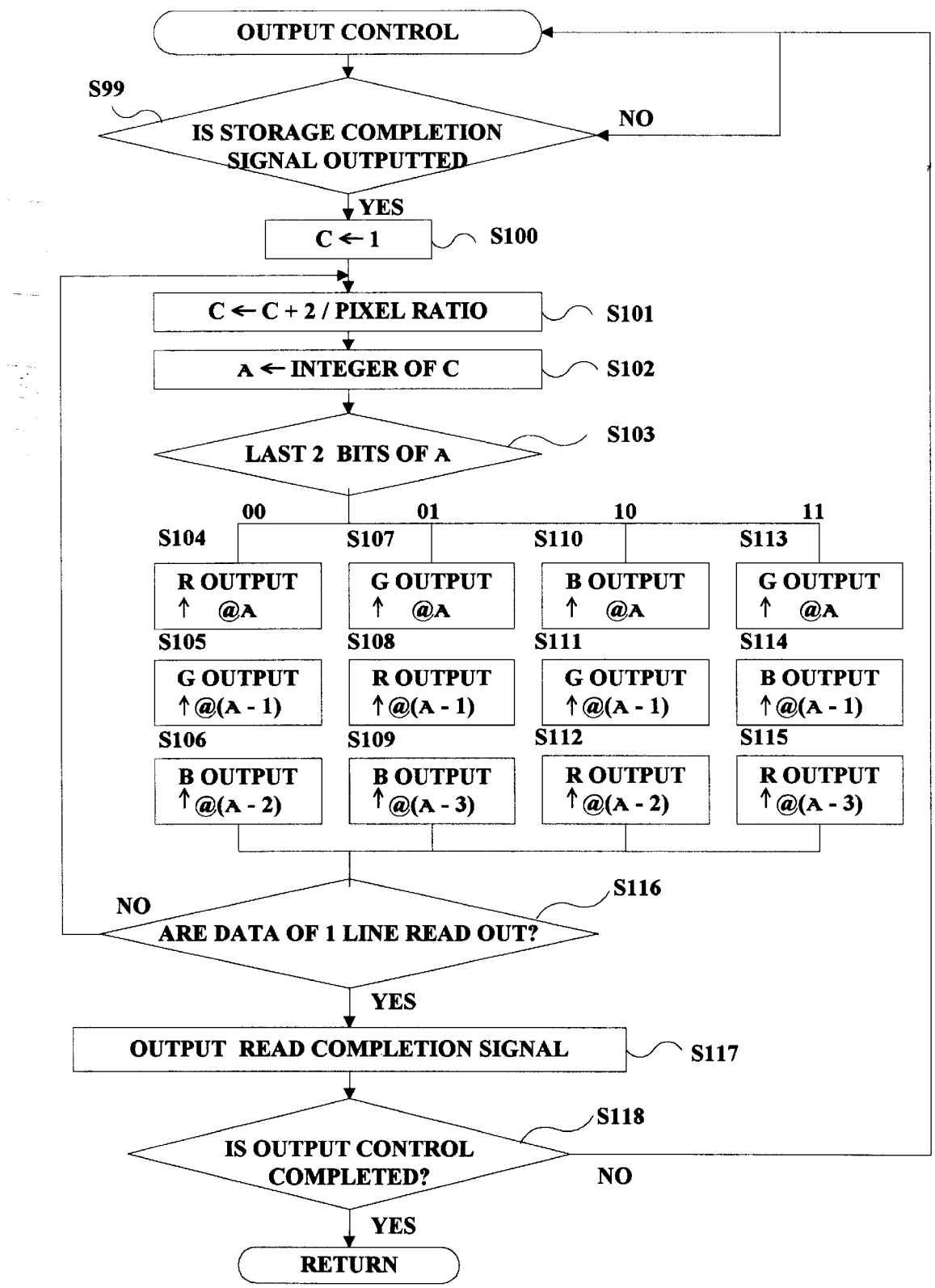
FIG. 11 is a flowchart of an output control process corresponding to the fifth embodiment of the present invention.
Figure 12:
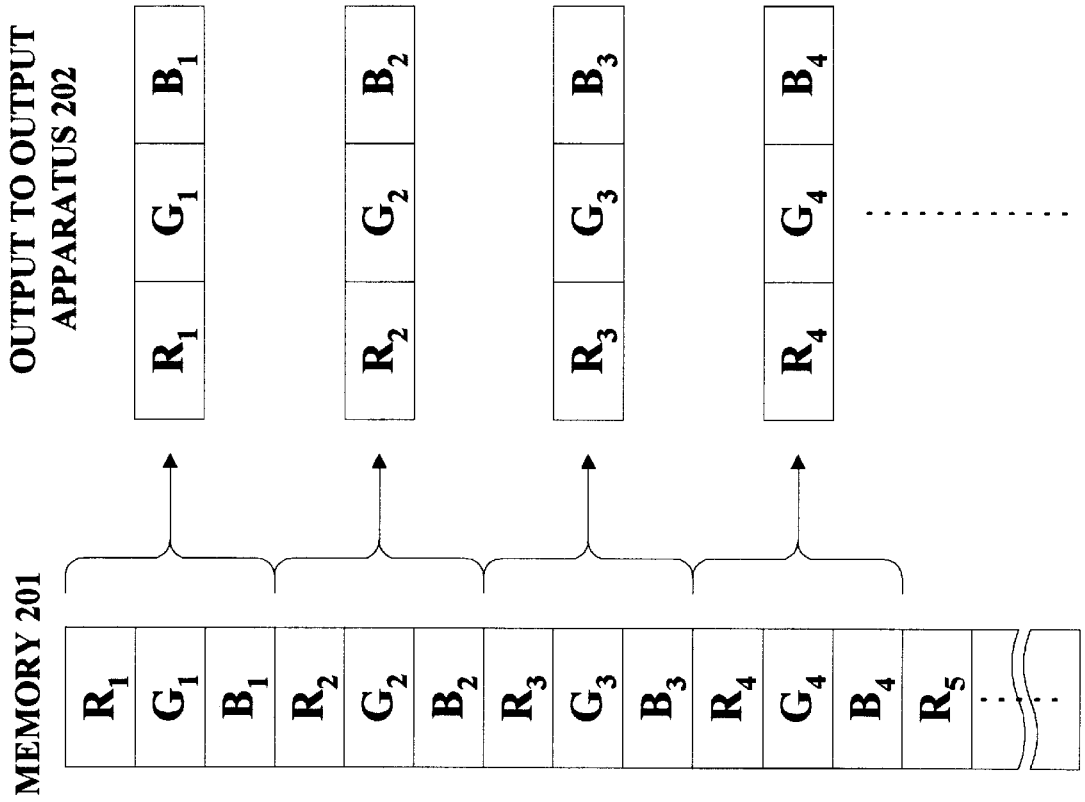
FIG. 12 illustrates a block diagram of a memory of a conventional image input apparatus and its output method.

FIG. 11 illustrates a flowchart of an output control operation of the fifth embodiment, which can deal with various pixel ratios including a pixel ratio of 2. The flowchart will now be described in detail.

In step S99, it is determined whether the storage completion signal for indicating the completion of storing the data for one line in the memory 204 has been received or not. If it has been received, the process goes to step S100. Otherwise, the process is repeated. In step S100, reading register $C$ s is set to 1. The reading register registers address values including decimals for dealing with various pixel ratios.

In step S101, a value of 2/pixel ratio is added to reading register $C$. For example, when the pixel ratio is 2, 2/2=1. Therefore, in step S101, $C$ is increased by one. Further, when the pixel ratio is 1, 2/1=2. Therefore, in step S101, $C$ is increased by 2. Furthermore, when the pixel ratio is 1.5, 2/1.5 =1.333 . . . . Therefore, in step S101, $C$ is increased by 1.333 . . . . In step S102, a value calculated by the equation $C'=[C]$ is set to reading address $A$, where $C'$ is the largest natural number less than $C$.

In step S103, the last two bits (binary digits) of reading address $A$ are detected. If they are "00," the process goes to step S104. If they are "01," the process goes to step S107. If they are "10," the process goes to step S110. If they are "11," the process goes to step S113.

For example, when the pixel ratio is 2, address $A$ is incrementally increased by one so that steps S110, S113, S104 and S107 are sequentially selected. Therefore, all data stored in the memory 204 illustrated in FIG. 10b are sequentially read out to output the data for all pixels $s_1$, $s_2$, . . . . Thus, the data for the first pixel $s_1$ are read out in step S110 through Si12. Further, when the pixel ratio is 1, address $A$ is incrementally increased by two so that steps S113 and S107 are alternately selected. Therefore, the data stored in the memory 204 illustrated in FIG. 10b are sequentially read out to output the data for even-numbered pixels $s_2$, $s_4$, . . . .In step S104, based on address $A$ set in step S102, the data stored at address $A$ as representing red is outputted to the display memory or the storage device. In step S105, the data stored at address $\mathbb{A}-1$ is outputted as representing green. In step S106, the data stored at address $\mathbb{A}-2$ is outputted as representing blue.

In step S107, the data stored at address $\mathbb{A}$ is outputted as representing green. In step S108, the data stored at address $\mathbb{A}-1$ is outputted as representing red. In step S109, the data stored at address $\mathbb{A}-3$ is outputted as representing blue.

In step S110, the data stored at address $\mathbb{A}$ is outputted as representing blue. In step S111, the data stored at address $\mathbb{A}-1$ is outputted as representing green. In step S112, the data stored at address $\mathbb{A}-2$ is outputted as representing red.

In step S113, the data stored at address $\mathbb{A}$ is outputted as representing green. In step S114, the data stored at address $\mathbb{A}-1$ is outputted as representing blue. In step S115, the data stored at address $\mathbb{A}-3$ is outputted as representing red.

In step S116, based on the data of address $\mathbb{A}$, it is determined whether the data for one line have been completely outputted or not. If they have been completely outputted, the process goes to step S117. Otherwise, the process goes back to step S101.

In step S117, the reading completion signal is transmitted to the input control circuit. In step S118, based on the number of the reading completion signal or the like, it is determined whether the output control operation has been completed or not. If it has been completed, the process exits. Otherwise, the process goes back to step S99 to repeat the same operations.

In the preceding embodiments, the number of pixels to be read out are varied in accordance with the pixel ratio, and part of the read-out pixels are omitted in accordance with the pixel ratio. The fifth embodiment is different from the other embodiments in that address $\mathbb{A}$ for reading out data from the memory is changed in accordance with the pixel ratio. In the fifth embodiment, the two-line CCD is adopted. However, even when the three-line CCD is used, it is possible to directly designate the address, thereby implementing the omitting operation simultaneously.

While the preferred embodiments of the present invention have been described, it is to be understood that modifications will be apparent to those skilled in the art without departing from the spirit of the invention. For example, the color line sensor is not limited to the three-line, two-line or one-line type described above and may be modified for the same purpose.

In the conventional image input apparatus, the pixel ratio can be set only to $1/\gamma$. The image processing system of the present invention can obtain image data of an arbitrary intermediate pixel ratio at high speed and low cost without any special image interpolation processing. Accordingly, it is easy to adjust the image to the output size and a desired pixel ratio. Further, since data are outputted with even intervals, there is little deterioration of the image such that an inclined line is displayed as a discrete line.

Since the data processed at high speed are sequentially transmitted to the external apparatus, an expensive buffer memory for storing data for one image is not required and its installation space can be saved.

Since the image processing method is relatively simple, the image processing can be controlled by a software program stored in the microcomputer. Especially, the application of the RISC can provide a one-chip microcomputer.

Thus, the image processing system of the present invention can implement image processing at high speed and low cost with a compact structure.

What is claimed is:

1. An image processing system comprising:

a color line sensor for decomposing a pixel of an original image into three light components, each light component representing one of three primary colors, and for converting the light components to analog signals, the color line sensor having a number of pixels;

analog-to-digital converting means for converting the analog signals to digital data;

storage means for storing the digital data;

input control means for controlling the color line sensor and the analog-to-digital converter to store the digital data in the storage means in the order in which the digital data are read out from the color line sensor; and output control means for reading out the digital data from the storage means repeatedly in part such that a new pixel is formed by a part of the digital data of a first pixel and a part of the digital data of a second pixel adjacent to the first pixel and for repeating this reading operation to produce the digital data corresponding to a number of pixels greater than the number of pixels of the color line sensor, wherein the color line sensor includes a line of photoelectric converting elements for outputting the analog signals respectively representing the three primary colors, wherein the storage means sequentially stores the digital data respectively representing the three primary colors at corresponding addresses, and wherein the output control means reads out the digital data in a first mode in which the address is shifted back by one after the digital data at three addresses have been read out, and in a second mode in which the address is shifted back by two after the digital data at three addresses have been read out.

2. The image processing system according to claim 1, wherein the output control means reads out the digital data stored in the storage means in accordance with a preset pixel ratio.

3. The image processing system according to claim 2, further comprising a display memory for storing the read out data.

4. The image processing system according to claim 1, wherein at least one of the input control means and the output control means comprises a microcomputer of a reduced instruction set computer type.

5. An image processing system comprising:

a color line sensor for decomposing a pixel of an original image into three light components, each light component representing one of three primary colors, and for converting the light components to analog signals, the color line sensor having a number of pixels;

analog-to-digital converting means for converting the analog signals to digital data;

storage means for storing the digital data;

input control means for controlling the color line sensor and the analog-to-digital converter to store the digital data in the storage means in the order in which the digital data are read out from the color line sensor; and output control means for reading out the digital data from the storage means repeatedly in part such that a new pixel is formed by a part of the digital data of a first pixel and a part of the digital data of a second pixel adjacent to the first pixel and for repeating this reading operation to produce the digital data corresponding to a number of pixels greater than the number of pixels of the color line sensor, wherein the color line sensor includes a first line of photoelectric Converting elements for outputting the analog signals representing the color green and a second line of photoelectric converting elements alternately arranged for outputting the analog signals representing the color red and the color blue, respectively, wherein the storage means sequentially stores the digital data respectively representing the three primary colors at corresponding addresses, and wherein the output control means combines the same digital data representing the color green with two different sets of digital data representing the color red and the color blue to generate digital data for two pixels.

6. An image processing system comprising:

a color line sensor for decomposing a pixel of an original image into three light components, each light component representing one of three primary colors, and for converting the light components to analog signals, the color line sensor having a number of pixels;

analog-to-digital converting means for converting the analog signals to digital data;

storage means for storing the digital data;

input control means for controlling the color line sensor and the analog-to-digital converter to store the digital data in the storage means in the order in which the digital data are read out from the color line sensor; and output control means for reading out the digital data from the storage means repeatedly in part such that a new pixel is formed by a part of the digital data of a first pixel and a part of the digital data of a second pixel adjacent to the first pixel and for repeating this reading operation to produce the digital data corresponding to a number of pixels greater than the number of pixels of the color line sensor, wherein the color line sensor includes a first line of photoelectric converting elements for outputting the analog signals representing the color red, a second line of photoelectric converting elements for outputting the analog signals representing the color green, and a third line of photoelectric converting elements for outputting the analog signals representing the color blue, wherein the storage means sequentially stores the digital data respectively representing the three primary colors at corresponding addresses, and wherein the output control means reads out the digital data in a first mode in which the address is shifted back by one after the digital data at three addresses have been read out, and in a second mode in which the address is shifted back by two after the digital data at three addresses have been read out.

7. An image processing system for processing data outputted from an image input apparatus having a color line sensor for picking up an image of an original, the system comprising:

storage means for sequentially storing three types of data, each type of data representing one of three primary colors and outputted from the image input apparatus, in the order in which the data are outputted;

calculating means for calculating an address to read out the data stored in the storage means such that a series of three data respectively representing the three primary colors and composing a first pixel partially overlaps with a series of three data respectively representing the three primary colors and composing a second pixel next to the first pixel; and producing means for reading out, from the storage means in accordance with the address calculated by the calculating means, a series of three data respectively representing the three primary colors to produce image data of the three primary colors for one pixel, wherein the producing means reads out the three data in a first mode in which the address is shifted back by one after the three data at three addresses have been read out, and in a second mode in which the address is shifted back by two after the three data at three addresses have been read out.

8. The image processing system according to claim 7, further comprising image display means for displaying an image based on the image data produced by the producing means.

9. The image processing system according to claim 7, further comprising second storage means for storing the image data produced by the producing means.

10. The image processing system according to claim 7, wherein the calculating means change the address in accordance with a preset pixel ratio.

11. The image processing system of claim 7, further comprising extracting means for extracting in accordance with a preset pixel ratio the image data produced by the producing means.

12. The image processing system according to claim 7, wherein the original is a developed silver salt film.

13. An image processing method for decomposing by a color line sensor a pixel of an image of an original into three light components, each component representing one of three primary colors, converting the light components to image signals and producing digital image data from the image signals, the method comprising the steps of:

sequentially converting to digital data the image signals outputted from the color line sensor;

sequentially storing the digital data in a storage device at corresponding addresses in the order in which the digital data are converted;

reading out the digital data from the storage device repeatedly in part by designating the addresses such that a new pixel is formed by a part of the digital data of a first pixel and a part of the digital data of a second pixel adjacent to the first pixel; and repeating this reading operation to produce the digital data corresponding to a number of pixels greater than a number of pixels of the color line sensor, wherein the color line sensor includes a line of photoelectric converting elements for outputting the analog signals respectively representing the three primary colors, and wherein the digital data are read out in a first mode in which the address is shifted back by one after the digital data at three addresses have been read out, and in a second mode in which the address is shifted back by two after the digital data at three addresses have been read out.

14. The image processing method according to claim 13, wherein in the step of reading out the digital data, the designation of the addresses is changed in accordance with a preset pixel ratio.

15. An image processing method for decomposing by a color line sensor a pixel of an image of an original into three light components, each component representing one of three primary colors, converting the light components to image signals and producing digital image data from the image signals, the method comprising the steps of:

sequentially converting to digital data the image signals outputted from the color line sensor;

sequentially storing the digital data in a storage device at corresponding addresses in the order in which the digital data are converted;

reading out the digital data from the storage device repeatedly in part by designating the addresses such that a new pixel is formed by a part of the digital data of a first pixel and a part of the digital data of a second pixel adjacent to the first pixel; and repeating this reading operation to produce the digital data corresponding to a number of pixels greater than a number of pixels of the color line sensor, wherein the color line sensor includes three independent lines of photoelectric converting elements, the three lines outputting the image signals representing the three primary colors, respectively, wherein, after the digital data representing the three primary colors for a first pixel have been stored in the storage device, the digital data representing the three primary colors for a second pixel adjacent to the first pixel are stored in the storage device, and wherein the digital data are read out in a first mode in which the address is shifted back by one after the digital data at three addresses have been read out, and in a second mode in which the address is shifted back by two after the digital data at three addresses have been read out.

16. An image processing system for processing data outputted from an image input apparatus having a color line sensor for picking up an image of an original, the system comprising:

a storage device for sequentially storing three types of data, each type of data representing one of three primary colors and outputted from the image input apparatus, in the order in which the data are outputted; and a controller for calculating an address to read out the data stored in the storage device such that a series of three data respectively representing the three primary colors and composing a first pixel partially overlaps with a series of three data respectively representing the three primary colors and composing a second pixel next to the first pixel, and for reading out, from the storage device in accordance with the calculated address, a series of three data respectively representing the three primary colors to produce image data of the three primary colors for one pixel, wherein the controller reads out the three data in a first mode in which the address is shifted back by one after the three data at three addresses have been read out, and in a second mode in which the address is shifted back by two after the three data at three addresses have been read out.

17. The image processing system according to claim 16, wherein the controller comprises a microcomputer of a reduced instruction set computer type.

18. The image processing system according to claim 16, wherein the controller extracts the produced image data in accordance with a pixel ratio and outputs the extracted image data.

19. The image processing system according to claim 18, further comprising an image output apparatus including a second storage device for storing the extracted image data outputted from the controller.

20. The image processing system according to claim 19, wherein the image output apparatus includes a display for displaying the image of the original based on the image data stored in the second storage device.

* * * * *